(12) United States Patent
Negishi

(10) Patent No.: US 10,270,990 B2
(45) Date of Patent: Apr. 23, 2019

(54) IMAGING ELEMENT, IMAGING APPARATUS, AND IMAGING SIGNAL PROCESSING METHOD

(71) Applicant: CANON KABUSHIKI KAISHA, Tokyo (JP)

(72) Inventor: Norio Negishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 15/598,782

(22) Filed: May 18, 2017

(65) Prior Publication Data

US 2017/0353679 A1 Dec. 7, 2017

(30) Foreign Application Priority Data

Jun. 1, 2016 (JP) .................. 2016-110502

(51) Int. Cl.
*H04N 5/355* (2011.01)
*H04N 5/232* (2006.01)
*H04N 5/235* (2006.01)
*H04N 5/378* (2011.01)
*H04N 5/369* (2011.01)

(52) U.S. Cl.
CPC ....... *H04N 5/35581* (2013.01); *H04N 5/2353* (2013.01); *H04N 5/23212* (2013.01); *H04N 5/23267* (2013.01); *H04N 5/35554* (2013.01); *H04N 5/3696* (2013.01); *H04N 5/378* (2013.01)

(58) Field of Classification Search
CPC .................................. H04N 5/35581

USPC ......................................... 348/308
See application file for complete search history.

(56) References Cited

U.S. PATENT DOCUMENTS

| 9,531,960 B2 | 12/2016 | Kimura | |
|---|---|---|---|
| 9,538,068 B2 | 1/2017 | Kishi | |
| 10,051,217 B2 * | 8/2018 | Kondo | H04N 5/23212 |
| 2013/0286275 A1 * | 10/2013 | Ogawa | H04N 5/23212 |
| | | | 348/345 |

FOREIGN PATENT DOCUMENTS

| JP | 2003-179819 A | 6/2003 |
|---|---|---|
| JP | 2013-072906 A | 4/2013 |
| JP | 2015-144416 A | 8/2015 |

* cited by examiner

*Primary Examiner* — Joel W Fosselman
(74) *Attorney, Agent, or Firm* — Cowan, Liebowitz & Latman, P.C.

(57) ABSTRACT

An imaging element for acquiring signals from a plurality of pixel units to perform a plurality of types of signal processing on the signals is provided that includes a setting unit configured to set signal output conditions for first and second photoelectric conversion units provided in each of first and second pixel units; and a signal processing unit configured to perform first signal processing using signals of the first and second photoelectric conversion units set with first to third output conditions by the setting unit and second signal processing for processing the signals of the first and second photoelectric conversion units set with any one of the first to third output conditions by the setting unit.

17 Claims, 13 Drawing Sheets

IMAGING ELEMENT, IMAGING APPARATUS, AND IMAGING SIGNAL PROCESSING METHOD

BACKGROUND OF THE INVENTION

Field of the Invention

The present invention relates to an imaging element and an imaging apparatus capable of acquiring signals from a plurality of pixel units to perform image generation and focus detection on the signals.

Description of the Related Art

In an imaging apparatus, a process of generating a image having a dynamic range that is apparently wider than a dynamic range of an image capable of being acquired in single capturing (hereinafter also referred to as an HDR image) is performed. Technology for regularly arranging pixels constituting an imaging element and having different aperture ratios to generate an HDR image is disclosed (Japanese Patent Laid-Open No. 2003-179819). Also, technology for generating an HDR image by using an imaging element having a pupil division pixel unit in which a plurality of pixels are allocated to one microlens is disclosed (Japanese Patent Laid-Open No. 2015-144416).

On the other hand, in a configuration of an imaging apparatus capable of acquiring images of different viewpoints in single capturing, it is possible to acquire a pair of object images formed by light beams that passed through different pupil regions. Technology for performing focus detection according to a correlation calculation from a pair of acquired object images is disclosed (Japanese Patent Laid-Open No. 2013-072906). Both the technology for acquiring an HDR image in single capturing and the technology for performing focus detection in single capturing are an important technology that contributes to the enhancement of image quality and speed of a digital camera.

A device disclosed in Japanese Patent Laid-Open No. 2013-072906 performs focus detection using an imaging element having a pupil division pixel unit in which a plurality of pixels are allocated to one microlens, but a process of generating an HDR image has not been mentioned. In a device disclosed in Japanese Patent Laid-Open No. 2015-144416, an HDR image is generated according to a combination of pixels having different pixel aperture ratios with respect to a microlens. In this scheme, phase difference detection is performed using pixels in which incident light is blocked and pixel signals are significantly degraded or signals from saturated pixels. Thus, sufficient accuracy of phase difference detection may not be obtained.

SUMMARY OF THE INVENTION

The present invention provides an imaging element and an imaging apparatus capable of acquiring signals from a plurality of pixel units to perform a plurality of types of signal processing on the signals.

According to an aspect of the present invention, an imaging element for acquiring signals from a plurality of pixel units to perform a plurality of types of signal processing on the signals is provided that includes a setting unit configured to set signal output conditions for first and second photoelectric conversion units provided in each of first and second pixel units; and a signal processing unit configured to perform first signal processing using signals of the first and second photoelectric conversion units set with first to third output conditions by the setting unit and second signal processing for processing the signals of the first and second photoelectric conversion units set with any one of the first to third output conditions by the setting unit.

According to the present invention, it is possible to provide an imaging element and an imaging apparatus capable of acquiring signals from a plurality of pixel units to perform a plurality of types of signal processing on the signals.

Further features of the present invention will become apparent from the following description of exemplary embodiments (with reference to the attached drawings).

DESCRIPTION OF THE EMBODIMENTS

Figure 1:
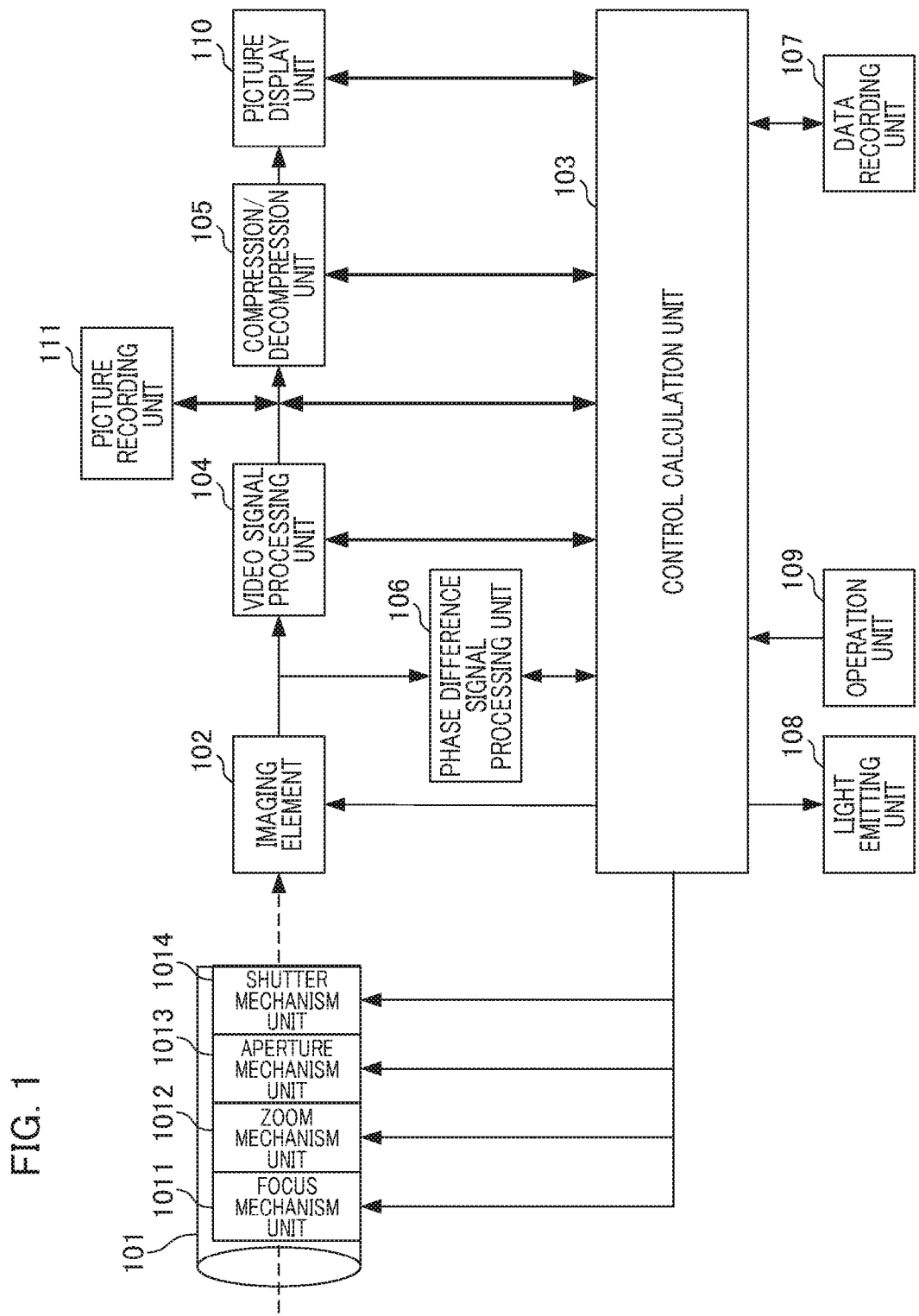
FIG. 1 is a block diagram illustrating a system configuration of an imaging apparatus according to the present invention.

Hereinafter, preferred embodiments of the present invention will be described in detail with reference to the accompanying drawings. An imaging apparatus of the present embodiment can be applied to an electronic still camera with a moving-image function, a video camera, and the like.

Summary of Embodiment

After summary of an imaging element, an imaging apparatus, and an imaging signal processing method according to the embodiments of the present invention are primarily described, embodiments will be described in detail. The present invention is applicable to an imaging element having a pixel unit with a plurality of photoelectric conversion units, and an imaging apparatus including the imaging element. Each of the plurality of pixel units has first and second photoelectric conversion units, and an output condition of a pixel signal is independently set. The output condition of the pixel signal is, for example, one of conditions such as an ISO sensitivity of a pixel, an exposure time, an optical aperture, and a degree of amplification of a gain amplifier, or a combination of a plurality of conditions, and an exposure setting value can be changed arbitrarily. A signal processing unit within the imaging element or a signal processing unit of the imaging apparatus performs first and second signal processing described below.

The first signal processing is performed using signals of the first and second photoelectric conversion units set with first to third output conditions. In the following embodiment, a dynamic range expansion process (HDR processing) of an image signal will be described as a specific example of an image generation process. For example, it is possible to generate the image signal with a wide dynamic range by combining a plurality of signals having different output conditions. Also, in the second signal processing, the signals of the first and second photoelectric conversion units set with any one of the first to third output conditions are processed. In the following embodiment, a focus detection process of the optical imaging system will be described as a specific example. A focus detection signal is generated by the second signal processing and focus adjustment control is enabled.

The first and second signal processing is performed in parallel on the basis of pixel signals of one captured frame image. In other words, it is possible to prevent the occurrence of image shake of an object with a large amount of motion, which is a problem when each process is performed across a plurality of frames, or to reduce image shake.

Also, a control mode of the imaging element includes a first control mode in which only a focus detection calculation is performed and a second control mode in which a focus detection calculation and HDR processing are performed. A control unit changes content of signal processing on a signal acquired from the imaging unit by switching the control mode. For example, when a focus detection calculation of a phase difference detection method is performed in the first control mode, a phase difference is detected from an image (a parallax image) having a parallax output by each of the plurality of photoelectric conversion units in the pixel unit. When an image signal A is acquired from an output of the first photoelectric conversion unit and an image signal B is acquired from an output of the second photoelectric conversion unit, a correlation calculation is performed on the image signal A and the image signal B, and an amount of focal shift is calculated from the calculation result. Also, in the second control mode, a calculation of a phase difference detection scheme and HDR processing are performed on the image acquired in one imaging operation, i.e., a picture signal of one frame. Also, the embodiment of the present invention is not limited to the phase difference detection scheme. The present invention can be applied to a focus detection process or a contrast detection process based on refocus processing by shift addition or a scheme in which a plurality of detection schemes are combined and used together.

For the configuration of the pixel unit, an example of the photoelectric conversion unit divided into two in a horizontal direction, which is a pupil division direction, will be shown and described in a first embodiment and the example of the photoelectric conversion unit divided into two in each of the horizontal direction and a vertical direction will be shown and described in a second embodiment. There is also the example in which the number of divisions is further increased to 6, 9, or the like as the embodiment of the present invention. Also, a shape of the photoelectric conversion unit is not limited to a rectangular shape, and can also be applied to the embodiment designed as a polygon such as a hexagon.

First Embodiment

In the first embodiment of the present invention, the imaging apparatus capable of generating the HDR image of two or more stages while performing phase difference detection from the image acquired in single capturing will be described with reference to FIGS. 1 to 9. In the present embodiment, an imaging apparatus using the imaging element in which the plurality of pixel units are arranged in a two-dimensional array will be described. Each pixel unit includes two photoelectric conversion units that receive light passing through different pupil part regions in an optical imaging system.

The configuration of the imaging apparatus will be described with reference to FIG. 1. An optical lens barrel 101 includes a plurality of lenses, a focus mechanism unit 1011, a zoom mechanism unit 1012, an aperture mechanism unit 1013, a shutter mechanism unit 1014, and the like. Light from the object passing through the lens in the optical lens barrel 101 is adjusted to an appropriate amount of light by the aperture mechanism unit 1013, and the image is formed on an imaging plane on an imaging element 102. The focus mechanism unit 1011 is driven on the basis of a control signal from a control calculation unit 103 and performs focus adjustment according to movement control of the focus lens for focus adjustment. The zoom mechanism unit 1012 is driven on the basis of the control signal from the control calculation unit 103 and changes an angle of view according to movement control of a variable magnification lens in accordance with a zoom operation by a user. The aperture mechanism unit 1013 and the shutter mechanism unit 1014 are driven on the basis of the control signal from the control calculation unit 103 and change each of an aperture value and a shutter time.

The imaging element 102 performs an imaging operation such as exposing, signal reading, resetting, or the like in accordance with the control signal from the control calculation unit 103, and outputs a corresponding image signal. Details thereof will be described below. A video signal processing unit 104 acquires a image signal from the imaging element 102 and outputs a video signal by performing various types of signal processing such as a correction process of correcting a defect of a pixel, a variation of a signal, or the like caused by the imaging element 102, HDR processing, a white balance adjustment process, gamma processing, and a color correction process. Also, the video signal processing unit 104 detects brightness of each region for exposure control of the imaging element 102 and also performs an automatic exposure (AE) process of calculating an appropriate exposure.

A compression/decompression unit 105 operates under the control of the control calculation unit 103 and performs a compression encoding process on a video signal from the video signal processing unit 104 with a still-image data format of a predetermined method. For example, a Joint Photographic Coding Experts Group (JPEG) method or the like is available. Also, the compression/decompression unit 105 decompresses and decodes encoded data of the still image supplied from the image recording unit 111 via the control calculation unit 103. Further, a compression encoding/decompression decoding process on a moving image can be performed according to a Moving Picture Experts Group (MPEG) method or the like.

In accordance with the control signal from the control calculation unit 103, a phase difference signal processing unit 106 acquires pixel signals (phase difference signals) corresponding to different pupil planes from the imaging element 102 and performs a phase difference detection process. When a phase difference detection signal is calculated, the phase difference signal processing unit 106 performs the phase difference detection process after output level correction is performed if a signal having a difference in an output level due to a factor other than a pupil plane difference between pixel signals corresponding to different pupil planes is used. Because a process of generating a phase difference detection signal is well known, a description thereof will be omitted, and an output level correction process will be described below. The phase difference detection signal calculated by the phase difference signal processing unit 106 is sent to the control calculation unit 103.

The control calculation unit 103 is, for example, a microcontroller including a central processing unit (CPU), a read only memory (ROM), a random access memory (RAM), and the like. The control calculation unit 103 performs a program stored in the ROM or the like to comprehensively control each unit of the imaging apparatus. For example, the control calculation unit 103 calculates an amount of defocus indicating a focus state of the optical imaging system on the basis of an acquired phase difference detection signal. From the calculated amount of defocus, the control calculation unit 103 calculates an amount of drive of the focus lens necessary for obtaining an in-focus state, and sends a drive control signal to the focus mechanism unit 1011. The focus mechanism unit 1011 drives an AF (automatic focus adjustment) mechanism in accordance with the drive control signal from the control calculation unit 103 and moves the focus lens to a target position.

A data recording unit 107 records a parameter or the like obtained through the calculation of the control calculation unit 103. A light emitting unit 108 is a device that radiates light toward the object when it is determined that an exposure value of the object is low according to the AE process of the video signal processing unit 104. The light emitting unit 108 is a strobe device using a xenon tube, a light emitting device of an LED, or the like.

An operation unit 109 includes various operation keys such as a shutter release button, a lever, a dial, a touch panel, and the like. The operation unit 109 outputs a control signal corresponding to an input operation of a user to the control calculation unit 103. An image display unit 110 includes a display device such as a liquid crystal display (LCD) and an interface circuit or the like for the device. The image display unit 110 generates a signal to be displayed on the display device from a video signal supplied from the control calculation unit 103, supplies the signal to the display device, and displays the image on a screen.

An image recording unit 111 includes, for example, a recording medium such as a portable semiconductor memory, an optical disc, a hard disk drive (HDD), a magnetic tape, or the like. The image recording unit 111 acquires an image data file encoded by the compression/decompression unit 105 from the control calculation unit 103 and records the image data file on a recording medium. Also, the image recording unit 111 reads designated data from the recording medium on the basis of a control signal from the control calculation unit 103 and outputs the read data to the control calculation unit 103.

Figure 2:
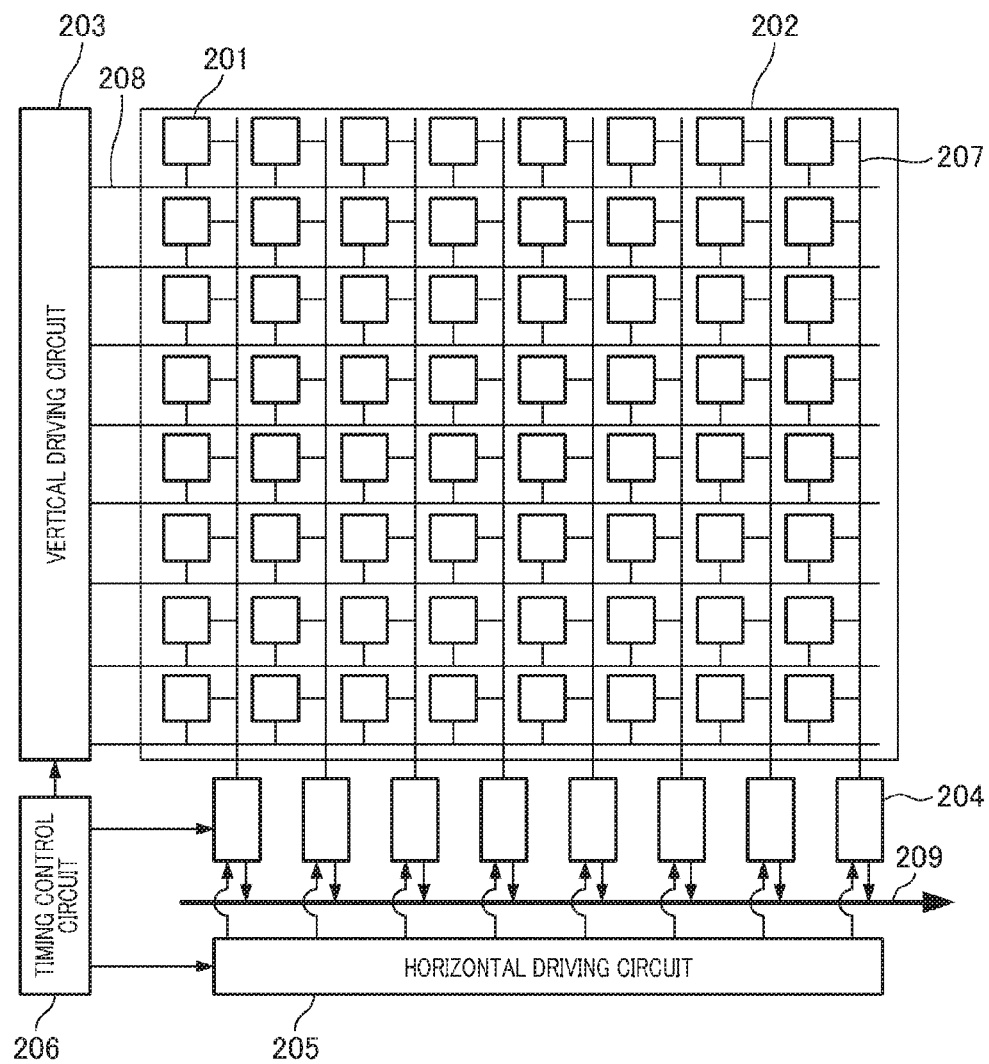
FIG. 2 is a block diagram illustrating a configuration of an imaging element according to the present invention.

Next, a configuration of the imaging element 102 in the present embodiment will be described with reference to FIG. 2. FIG. 2 is a diagram illustrating a configuration example of the imaging element 102. The imaging element 102 includes, for example, a pixel array unit 202 in which a plurality of pixel units 201 are arrayed in a matrix, and a peripheral circuit unit around the pixel array unit 202 on a semiconductor substrate using, for example, silicon (Si). The peripheral circuit unit includes a vertical driving circuit 203, column signal processing circuits 204, a horizontal driving circuit 205, a timing control circuit 206, and the like.

The pixel unit 201 includes a photodiode serving as a photoelectric conversion unit and a plurality of pixel transistors. Details of the pixel unit 201 will be described below with reference to FIGS. 3A, 3B, and 6. Each of the plurality of pixel transistors is, for example, a metal oxide semiconductor (MOS) transistor such as a transfer transistor, an amplification transistor, a selection transistor, and a reset transistor.

The vertical driving circuit 203 includes, for example, a shift register. The vertical driving circuit 203 selects a pixel drive wiring 208, supplies a pulse for driving the pixel unit 201 to the selected pixel drive wiring 208, and drives the pixel unit 201 in units of rows. The vertical driving circuit 203 sequentially selects and scans pixel units 201 on the pixel array unit 202 in the vertical direction in units of rows. A pixel signal based on a signal charge generated according to an amount of incident light on the photoelectric conversion unit of each pixel unit 201 is supplied to the column signal processing circuit 204 through a vertical signal line 207.

The column signal processing circuit 204 is arranged for each column of the pixel unit 201, and performs signal processing such as noise removal for each pixel column for pixel signals output from pixel units 201 in one row. For example, the column signal processing circuit 204 performs CDS processing for removing pixel-specific fixed pattern noise and signal processing such as an amplification process and AD conversion on a pixel signal of the pixel unit 201 output through the vertical signal line 207. CDS is an abbreviation for "correlated double sampling".

The horizontal driving circuit 205 includes, for example, a shift register, and sequentially selects column signal processing circuits 204 by sequentially outputting horizontal scanning pulses. A pixel signal from each of the column signal processing circuits 204 is output to a horizontal signal line 209. The timing control circuit 206 receives an input clock signal and data for an instruction of an operation mode and the like from the control calculation unit 103. On the basis of a vertical synchronization signal, a horizontal synchronization signal, and a master clock signal, the timing control circuit 206 generates a clock signal and a control signal serving as references for operations of the vertical driving circuit 203, the column signal processing circuit 204, the horizontal driving circuit 205, and the like.

Figure 3A:
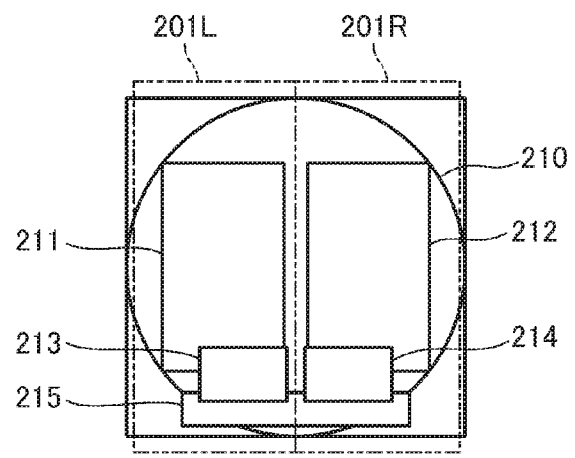
FIGS. 3A and 3B are diagrams illustrating a pixel configuration and a pixel array of the imaging element according to a first embodiment of the present invention.

A configuration and a pixel array of the pixel unit 201 of the imaging element 102 will be described with reference to FIGS. 3A and 3B. FIG. 3A is a schematic diagram illustrating a configuration example of photoelectric conversion units 201L and 201R that receive light passing through different pupil part regions of the optical imaging system. The photoelectric conversion units 201L and 201R respectively include photodiodes 211 and 212. The term "L" means that the photoelectric conversion unit is arranged on the left side when viewed from the front and the term "R" means that the photoelectric conversion unit is arranged on the right side when viewed from the front. Hereinafter, photodiode is abbreviated as "PD".

The photoelectric conversion unit 201L receives light passing through a part of the pupil region of the optical imaging system (a first pupil part region). The photoelectric conversion unit 201R receives light passing through a part of the pupil region (a second pupil part region) different from the first pupil part region. The photoelectric conversion unit 201L and the photoelectric conversion unit 201R are configured under one microlens 210 and respectively have one PD 211 and one PD 212 Transfer transistors 213 and 214 respectively read pixel signals of the PD 211 and the PD 212. The PD 211 and the PD 212 share a floating diffusion (FD) unit 215 that temporarily accumulates the pixel signals. The configurations of the two photoelectric conversion units are the same except that the PD 211 and the PD 212 read signals to be photoelectrically converted from light passing through different pupil part regions of the optical imaging system.

Pixel signals acquired from the photoelectric conversion unit 201L and the photoelectric conversion unit 201R pass through the vertical signal line 207 and the column signal processing circuit 204 (FIG. 2) and are read through the horizontal signal line 209 by the horizontal driving circuit 205 at any time in units of rows. Each pixel unit includes a plurality of constituent elements to be described below in addition to the illustrated constituent elements, but the constituent elements will be omitted because the constituent elements are not important to the description of the present invention.

Figure 3B:
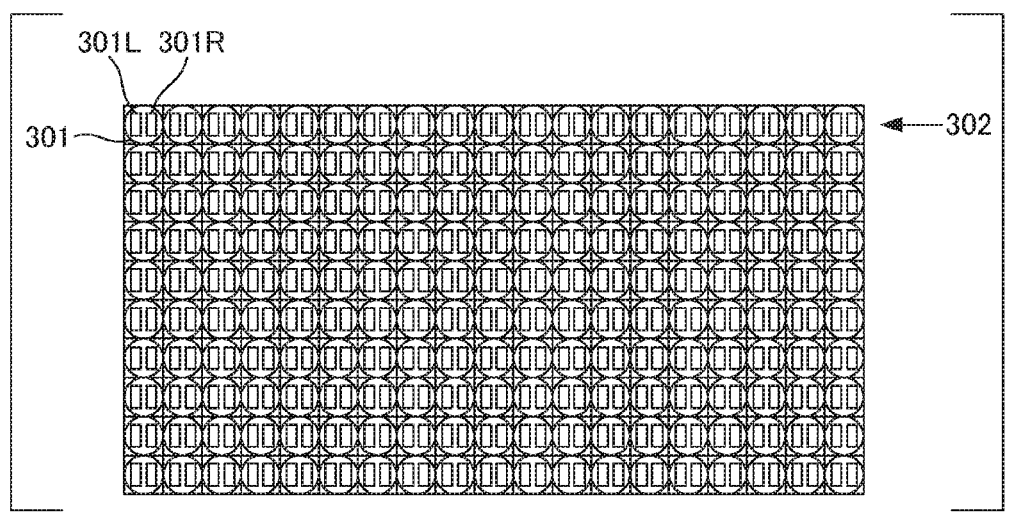

FIG. 3B is a plan view schematically illustrating a pixel array in the imaging element 102. In order to provide a two-dimensional image, the plurality of pixel units 201 having the configuration illustrated in FIG. 3A are arranged in a two-dimensional array in a predetermined direction. The predetermined direction is the horizontal direction and the vertical direction. PDs 301L and 301R in a pixel unit 301 constitute a photoelectric conversion unit divided into two in the pupil division direction (the horizontal direction in the present embodiment). In the pixel unit 301 of a row 302, the PD 301L corresponds to the PD 211 of FIG. 3A and the PD 301R corresponds to the PD 212 of FIG. 3A. A state of light reception in the imaging element 102 having the pixel array illustrated in FIG. 3B will be described with reference to FIG. 4A.

Figure 4A:
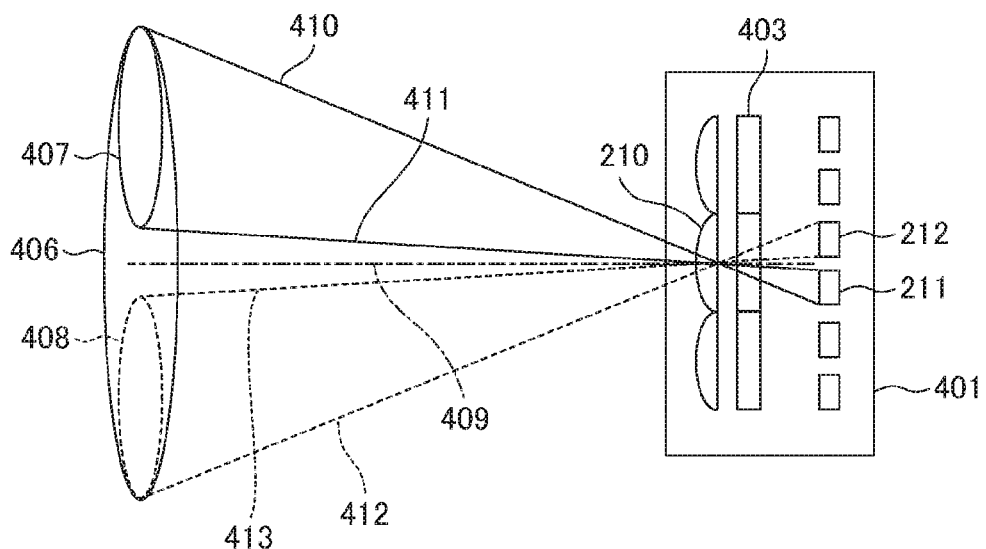
FIGS. 4A and 4B are schematic diagrams illustrating a relationship between an exit pupil and light reception of the imaging element according to the first embodiment of the present invention.

FIG. 4A is a conceptual diagram illustrating a state in which a light beam emitted from the exit pupil of the capturing lens is incident on the imaging element 102. The microlens 210, a color filter 403, the PD 211, and the PD 212 are shown in a cross section 401 of the pixel unit. Part regions 407 and 408 of the exit pupil of the capturing lens are shown in an exit pupil 406, and these regions are pupil part regions when viewed from each PD which receives light. An optical axis 409, which is the center of the light beam emitted from the exit pupil 406, is indicated by alternating long and short dashed lines with respect to a pixel having the central microlens 210. Light rays 410 and 411 are outermost light rays of light passing through the pupil part region 407, and light rays 412 and 413 are outermost light rays of light passing through the pupil part region 408.

The light emitted from the exit pupil 406 is incident on the imaging element 102 around the optical axis 409. As can be seen from FIG. 4A, among the light beams emitted from the exit pupil 406, an upper light beam passes through the microlens 210 and the color filter 403 with respect to a boundary of the optical axis 409 and is incident on the PD 212. Also, a lower light beam passes through the microlens 210 and the color filter 403 with respect to the boundary of the optical axis 409 and is incident on the PD 211. In other words, the PD 211 and the PD 212 receive light passing through different pupil part regions 408 and 407 of the exit pupil 406 of the capturing lens.

Referring to FIGS. 3A and 3B, for example, in the case of the pixel unit 301 included in the row 302, the PD 301L corresponds to the PD 211 that receives a light beam emitted from one of exit pupils (part regions) between which the optical axis 409 is interposed. An image obtained from the PD 301L is referred to as an image A, and an image signal thereof is referred to as the image signal A. The PD 301R corresponds to the PD 212 that receives a light beam emitted from the other of the exit pupils (part regions) between which the optical axis 409 is interposed. An image obtained from the PD 301R is referred to as an image B, and an image signal thereof is referred to as the image signal B.

In this manner, the exit pupil 406 is equally divided into the pupil part regions 407 and 408 around the optical axis 409, and light reception of the PD 211 and the PD 212 is performed so that a phase difference occurs between output signals in the PD 211 and the PD 212. This phase difference causes a change in an address of the pixel unit 201 in which pixel signals derived from the same object image appear in the image signal A and the image signal B corresponding to the pupil part regions 407 and 408 and the change is detected as an address interval. By detecting this address interval (phase difference detection), an amount of defocus is calculated. The PD 211 and the PD 212 are equally divided and arranged with respect to the optical axis 409. In other words, because the PDs 211 and 212 are not eccentric with respect to the exit pupil 406, even if some light rays are obstructed by constituent parts or the like in the optical lens barrel 101, there is an advantage that it is easy to deal with signal loss (shading) of the image S or the image B.

Figure 5:
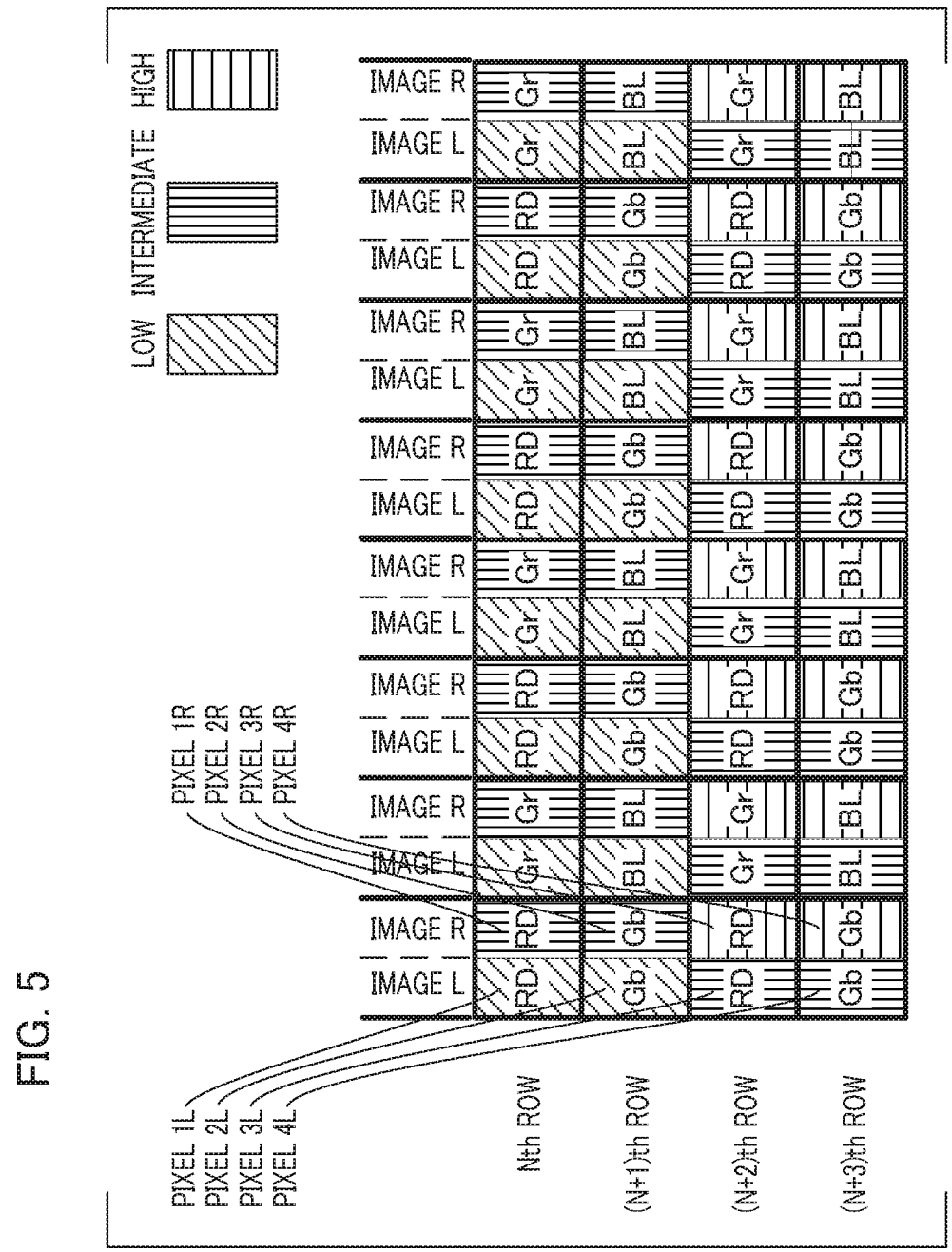
FIG. 5 is a schematic diagram illustrating an image signal from the imaging element according to the first embodiment of the present invention.

A image signal acquired by an imaging element having the pixel configuration and the pixel array described in FIGS. 3A and 3B will be described with reference to FIG. 5. FIG. 5 is a schematic diagram illustrating a image signal from an imaging element having a pixel array and a pixel configuration in which two identical color pixels are configured in one pixel unit. In order to perform HDR processing to be described below, capturing is performed so that a difference occurs between the output levels of the image signal A and the image signal B. A first column indicated by an image L shows a region of the photoelectric conversion unit 201L in each pixel unit and is a left column where the PD 211 exists. A pixel in this column is referred to as an image pixel A. The image pixel A outputs the image signal A as a pixel signal. On the other hand, a second column indicated by an image R shows a region of the photoelectric conversion unit 201R in each pixel unit, and is a right column where the PD 212 exists. A pixel in this column is referred to as an image pixel B. The image pixel B outputs the image signal B as a pixel signal.

In FIG. 5, units indicated by three different types of hatched lines are as follows.

A photoelectric conversion unit indicated by coarse slanted lines is a pixel of a low output level and is referred to as a low output pixel.

A photoelectric conversion unit indicated by vertical lines is a pixel of an intermediate output level and is referred to as an intermediate output pixel.

A photoelectric conversion unit indicated by horizontal lines is a pixel of a high output level and is referred to as a high output pixel.

Also, in the present embodiment, a pixel unit having a photoelectric conversion unit divided into two in the pupil division direction is exemplified, and each photoelectric conversion unit has a different signal output condition setting. All photoelectric conversion units in the pixel unit are collectively referred to as a main pixel, and an individual photoelectric conversion unit is referred to as a sub-pixel.

In each pixel unit shown in a range from an Nth row to an (N+3)th row, differences between corresponding color filters is distinguished by RD, Gr, Gb, and BL. RD (red) and Gr (green) filters are applied to the Nth row and the (N+2)th row, and Gb (green) and BL (blue) filters are applied to the (N+1)th row and the (N+3)th row.

In the pixel units of the Nth row and the (N+1)th row, the image pixel A corresponding to the image L is a low output pixel and the image pixel B corresponding to the image R is an intermediate output pixel. In the pixel units of the (N+2)th row and the (N+3)th row, the image pixel A corresponding to the image L is an intermediate output pixel and the image pixel B corresponding to the image R is a high output pixel. In other words, all of the image pixels B in the Nth row and the (N+1)th row and the image pixels A in the (N+2)th row and the (N+3)th row are intermediate output pixels. Although only four rows from the Nth row to the (N+3)th row are illustrated in FIG. 5, a pixel pattern is assumed to be repeatedly arranged two-dimensionally in a cycle of four rows.

In order to generate an output difference between the image pixel A and the image pixel B, signal output conditions of photoelectric conversion units are set to be different. For example, time values of different exposure times are set in the image pixel A and the image pixel B. In this case, in the Nth row and the (N+1)th row, a first exposure time is set in the image pixel A and a second exposure time that is longer than the first exposure time is set in the image pixel B. Then, a different exposure time is set every two rows. In other words, in the (N+2)th row and the (N+3)th row, the second exposure time is set in the image pixel A and a third exposure time that is longer than the second exposure time is set in the image pixel B.

As another method, there is a method of differently setting a degree of amplification of an amplification process using an amplifier in the column signal processing circuit 204. For example, degrees of amplification are separately set in the column signal processing circuits 204 for outputs of the image pixel A and the image pixel B. In this case, in the Nth row and the (N+1)th row, a first degree of amplification is set in the image pixel A and a second degree of amplification that is greater than the first degree of amplification is set in the image pixel B. Then, the degree of amplification of the amplification process is set to be different every two rows. In other words, in the (N+2)th row and the (N+3)th row, the second degree of amplification is set in the image pixel A and a third degree of amplification that is greater than the second degree of amplification is set in the image pixel B. Even when the exposure times of the image pixel A and the image pixel B are the same, an output level difference can be generated by setting the degrees of amplification to different values in the image pixel A and the image pixel B.

Additionally, different exposure times may be set in the image pixel A and the image pixel B, and the degree of amplification of the amplification process may be set to a different value every two rows in the column signal processing circuit 204. In contrast, the degrees of amplification of the amplification process are separately set to be different for the outputs of the image pixel A and the image pixel B in the column signal processing circuit 204, and different exposure times may be set for the image pixel A and the image pixel B every two rows. Specifically, for example, the exposure time of the image pixel B is set to be twice the exposure time of the image pixel A. In other words, an exposure ratio is A:B=1:2. The degrees of amplification of the amplification processes in the (N+2)th row and the (N+3)th row in the column signal processing circuit 204 are set to be twice those of the Nth row and the (N+1)th row. In this case, a ratio of output levels of the low output pixel, the intermediate output pixel, and the high output pixel is 1:2:4. In other words, pixel signals of three types of output levels can be obtained. A method of setting a signal output condition of each pixel in the present embodiment is arbitrary. Although a reading operation of all of the rows has been described in the present embodiment, the same applies to a method of driving a thinning read operation which is most suitable for capturing a moving-image or the like.

Although a relatively high output is set in the photoelectric conversion unit of the image column R with respect to the photoelectric conversion unit of an image column L in the example of FIG. 5, a relative relation between output levels may be reversed for each adjacent pixel unit. As a specific example, the Nth and (N+2)th rows are shown below.

|  | First column | | Second column | |
| --- | --- | --- | --- | --- |
|  | Image L | Image R | Image L | Image R |
| Nth row | Low | Intermediate | Intermediate | Low |
| (N + 2) th row | Intermediate | High | High | Intermediate |

In each pixel unit of the first column, an output of the image R column is relatively higher than that of the image column L. On the other hand, in each pixel unit of the second column, an output of the image column L is set to be relatively higher than that of the image column R. It is possible to set the same output condition between adjacent photoelectric conversion units in the first and second columns. For example, because degrees of amplification of amplification processes in column signal processing circuits of a stage subsequent to the adjacent photoelectric conversion units in the first and second columns can be set to the same value, it is possible to share a circuit unit. In the phase difference detection process, the signals of the intermediate output pixels of the image column R of the Nth row and the image column L of the (N+2)th row are used in the first column, and the signals of the intermediate output pixels of the image column L of the Nth row and the image column R of the (N+2)th row are used in the second column. In the HDR processing, three types of output levels of signals in each column are used.

The acquired pixel signals of the three types of output levels are output from the imaging element 102 and then sent to the video signal processing unit 104 and the phase difference signal processing unit 106. HDR processing and an output difference correction process to be described below are performed.

Figure 6:
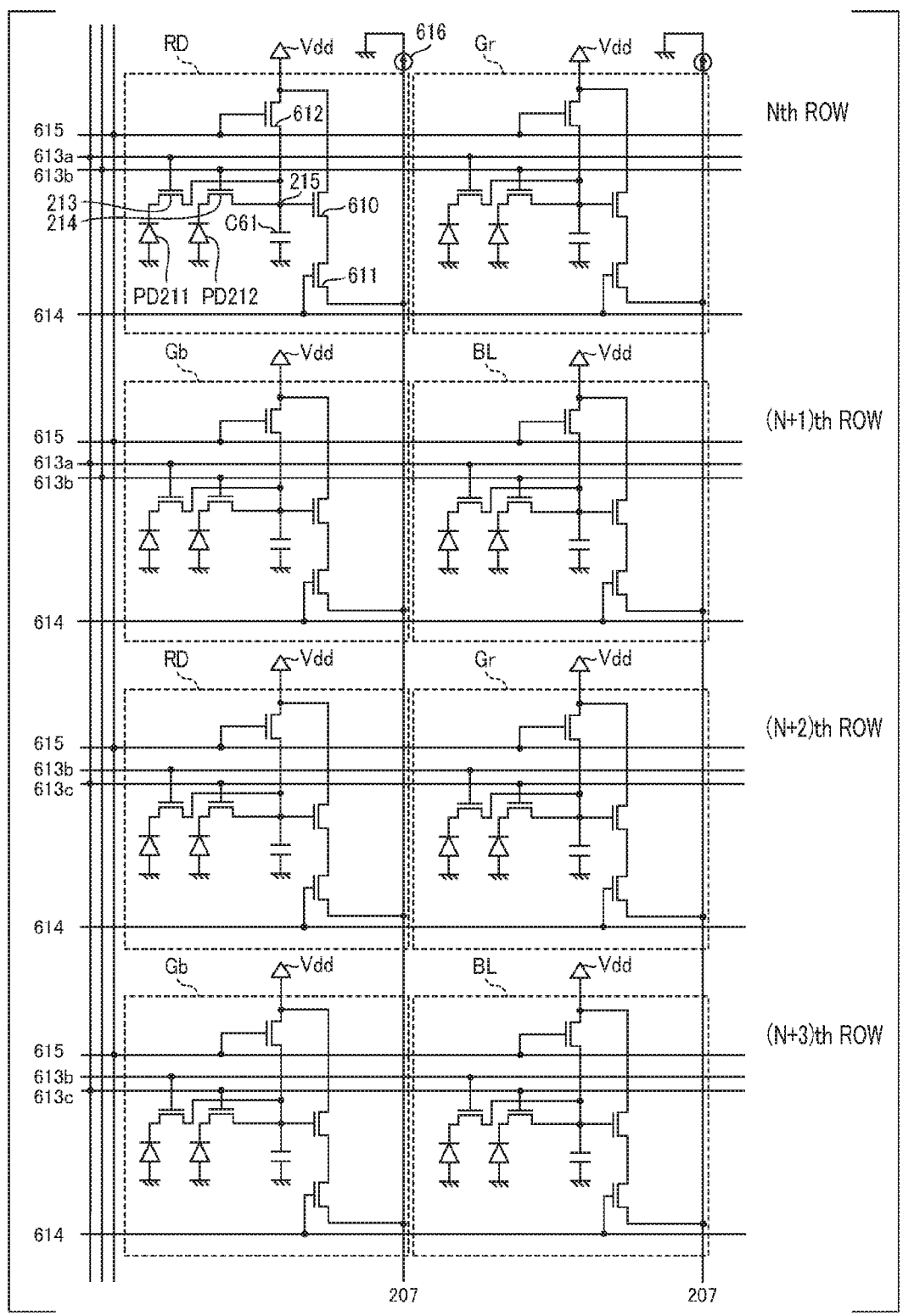
FIG. 6 is a circuit configuration diagram of the imaging element according to the first embodiment of the present invention.

Next, a circuit configuration and a basic operation of the imaging element 102 in the present embodiment will be described with reference to FIG. 6. FIG. 6 is an equivalent circuit diagram illustrating a circuit configuration of the pixel unit having the configuration illustrated in FIG. 2 and FIGS. 3A and 3B. Pixel units (8 pixel parts of RD, Gr, Gb, BL, RD, Gr, Gb, and BL) from the Nth row to the (N+3)th row in FIG. 5 among two-dimensionally arrayed pixel units are shown.

Each pixel unit includes the PD 211, the PD 212, and an FD unit 215. Further, a transfer transistor 213, a transfer transistor 214, an amplification transistor 610, a selection transistor 611, and a reset transistor 612 are provided. Transfer control lines 613a, 613b, and 613c, a row selection control line 614, and a reset control line 615 are connected to gates of the transistors. A constant current source 616 is connected to a source of the selection transistor 611. A parasitic capacitor of the FD unit 215 is denoted by C61.

The transfer control lines 613a, 613b, and 613c constituting the pixel drive wiring 208 are connected to the gates of the transfer transistors 213 and 214. In addition, the row selection control line 614 and the reset control line 615, which constitute the pixel drive wiring 208, are respectively connected to the gates of the selection transistor 611 and the reset transistor 612. These control lines extend in the horizontal direction and are configured to be able to simultaneously drive pixel units included in the same row or simultaneously drive pixel units of all of the rows.

The transfer control lines are separate transfer control lines for the photoelectric conversion units 201L and 201R, and different exposure times can be set for the photoelectric conversion units 201L and 201R. The transfer control line 613a is connected to the transfer transistors 213 of the photoelectric conversion units of the image columns L of the Nth row and the (N+1)th row. Consequently, it is possible to set the same exposure time in the photoelectric conversion units of the image columns L of the Nth row and the (N+1)th row. On the other hand, the transfer control line 613b is connected to the transfer transistors 214 of the photoelectric conversion units of the image columns R of the Nth row and the (N+1)th row and the transfer transistors 213 of the photoelectric conversion units of the image columns L of the (N+2)th row and the (N+3)th row. Consequently, it is possible to set the same exposure time in the photoelectric conversion units of the image columns R of the Nth row and the (N+1)th row and the photoelectric conversion units of the image columns L of the (N+2)th and (N+3)th rows. Further, the transfer control line 613c is connected to the transfer transistors 214 of the photoelectric conversion units of the image columns R of the (N+2)th row and the (N+3)th row. Consequently, it is possible to set the same exposure time in the photoelectric conversion units of the image columns R of the (N+2)th row and the (N+3)th row. The vertical signal line 207 is connected to the source of the selection transistor 611, and one end of the vertical signal line 207 is grounded via the constant current source 616.

The PD 211 and the PD 212 are elements that accumulate a charge generated according to photoelectric conversion. Sides P of the PD 211 and the PD 212 are grounded and sides N thereof are respectively connected to the sources of the transfer transistor 213 and the transfer transistor 214. If the transfer transistor 213 or 214 is turned on, the charge of the PD 211 or the PD 212 is transferred to the FD unit 215, and the charge is accumulated in the parasitic capacitor C61 of the FD unit 215.

The amplification transistor 610 has a drain to which a power supply voltage Vdd is applied, and a gate connected to the FD unit 215. The amplification transistor 610 amplifies a voltage of the FD unit 215 and outputs the amplified voltage. The selection transistor 611 is an element that selects a pixel unit from which a signal will be read in units of rows. The selection transistor 611 has a drain connected to the source of the amplification transistor 610 and a source connected to the vertical signal line 207. When the selection transistor 611 is turned on, the amplification transistor 610 and the constant current source 616 constitute a source follower circuit. Thereby, a voltage corresponding to the voltage of the FD unit 215 is output to the vertical signal line 207.

The reset transistor 612 has a drain to which the power supply voltage Vdd is applied and a source connected to the FD unit 215. The reset transistor 612 resets the voltage of the FD unit 215 to the power supply voltage Vdd.

Figure 7:
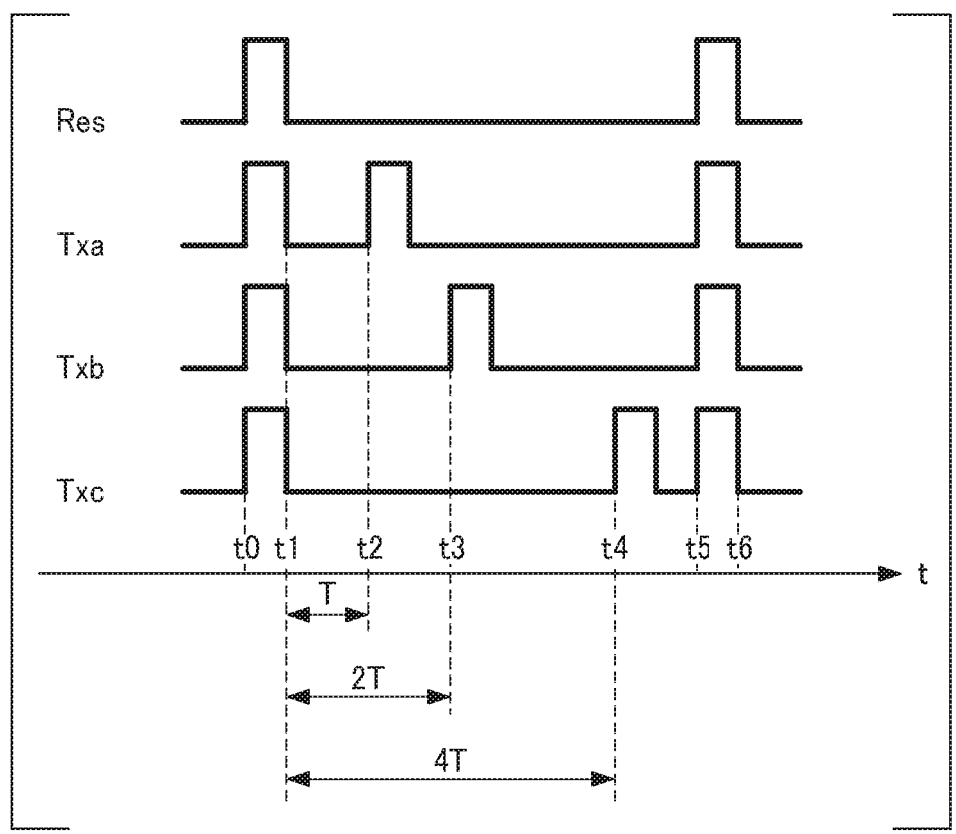
FIG. 7 is a diagram illustrating a driving timing of the imaging element according to the first embodiment of the present invention.

Next, a drive timing of the imaging element 102 will be described with reference to FIG. 7. The signals illustrated in FIG. 7 are as follows.

Res: Control signal sent to the reset control line 615 before and after an exposure period of the imaging element 102

Txa: Control signal sent to the transfer control line 613a

Txb: Control signal sent to the transfer control line 613b

Txc: Control signal sent to the transfer control line 613c.

Times t0 to t6 are shown on a time axis t, and it is assumed that t2−t1=T, t3−t1=2T, and t4−t1=4T.

In a period from the time t0 to the time t1, the control signals Res, Txa, Txb, and Txc are set to High, and the reset transistor 612 and the transfer transistors 213 and 214 are turned on. An operation of resetting a charge of all of the PDs 211 and PDs 212 of the imaging element 102 is performed. After the resetting, exposure starts in each of the PDs from the time t1.

The control signal Txa is set to High during a predetermined period of time (hereinafter referred to as $\Delta t$) from the time t2. A charge of a PD connected to the transfer control line 613a is read via the transfer transistor. A period of time from the time t1 serving as a starting point to the time t2 is T. Likewise, the control signal Txb is set to High during the predetermined period of time $\Delta t$ from the time t3. A charge of a PD connected to the transfer control line 613b is read via the transfer transistor. The period of time from the time t1 serving as the starting point to the time t3 is 2T. The control signal Txc is set to High during the predetermined period of time $\Delta t$ from the time t4. A charge of a PD connected to the transfer control line 613c is read via the transfer transistor. The period of time from the time t1 serving as the starting point to the time t4 is 4T.

In the period from the time t5 to the time t6, the control signals Res, Txa, Txb, and Txc are again set to High. By turning the reset transistor 612 and the transfer transistors 213 and 214 on, an operation of resetting the charge of all of the PDs 211 and the PDs 212 of the imaging element 102 is performed.

According to the above-described operation, it is possible to set a ratio of lengths of exposure times of the PDs connected to the transfer control line 613a, the transfer control line 613b, and the transfer control line 613c via the transfer transistors to 1:2:4. In FIG. 5, sub-pixels (photoelectric conversion units) of the image column L are denoted by 1L, 2L, 3L, and 4L, sub-pixels (photoelectric conversion units) of the image column R are denoted by 1R, 2R, 3R, and 4R, and exposure times of the pixels 1L and 2L are used as references. In this case, exposure times of the sub-pixels 1R, 2R, 3L, and 4L can be set to ×2 and exposure times of the sub-pixels 3R and 4R can be set to ×4. In other words, a ratio (an exposure ratio) of the exposure times of the low output pixel, the intermediate output pixel, and the high output pixel is T:2T:4T.

Figure 8:
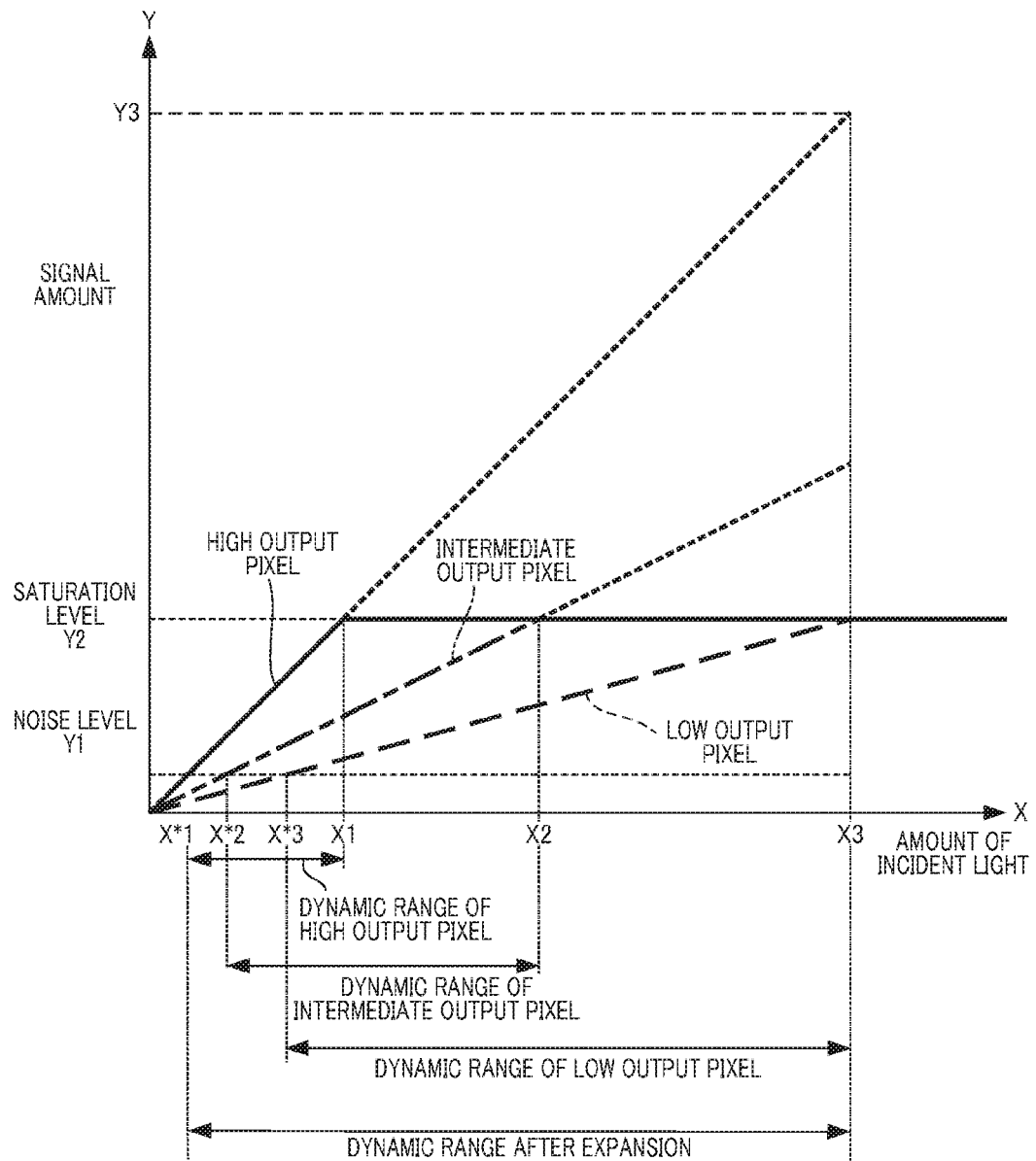
FIG. 8 is an explanatory diagram of HDR processing according to the first embodiment of the present invention.

Next, a dynamic range expansion process will be described with reference to FIG. 8. FIG. 8 is a diagram illustrating a relationship between an amount of incident light (a horizontal axis X) and an amount of pixel signals (a vertical axis Y) in the dynamic range expansion process. X*1 to X*3 and X1 to X3 are shown on the horizontal axis X, and Y1 to Y3 are shown on the vertical axis Y. Y1 represents a noise level and Y2 represents a saturation amount of signals. X*1 to X*3 represent amounts of incident light when each of the pixel signal levels of the high output pixel, the intermediate output pixel, and the low output pixel reaches the noise level Y1. X1 to X3 represent amounts of incident light when each of the pixel signal levels of the high output pixel, the intermediate output pixel, and the low output pixel reaches the saturation amount of signals Y2.

In the high output pixel, the saturation amount of signals Y2 is reached at a point in time at which the amount of incident light has reached X1. In the intermediate output pixel, the saturation amount of signals Y2 is reached at the point in time at which the amount of incident light has reached X2. In the low output pixel, the saturation amount of signals Y2 is reached at the point in time at which the amount of incident light has reached X3. On the other hand, when an amount of pixel signals obtained by light reception is less than or equal to Y1, the situation corresponds to the noise level so that the pixel signal thereof cannot be used. Consequently, the dynamic range of the high output pixel is a range of the amount of incident light from X*1 to X1. The dynamic range of the intermediate output pixel is the range of the amount of incident light from X*2 to X2. The dynamic range of the low output pixel is the range of the amount of incident light from X*3 to X3.

A case in which a ratio of output levels of the low output pixel, the intermediate output pixel, and the high output pixel is 1:2:4 will be described as the example. For the pixel unit 201, the video signal processing unit 104 obtains a pixel signal HDR after HDR processing according to the following Equations (1) to (5) in accordance with the amount of incident light.

When X*1<(amount of incident light)≤X*2

$$\text{Pixel signal HDR}=(\text{high output pixel signal}) \quad (1)$$

When X*2<(amount of incident light)≤X*3

$$\text{Pixel signal HDR}=(\text{high output pixel signal})\times(1-\alpha)+ \\ (\text{intermediate output pixel signal})\times\alpha\times2 \quad (2)$$

When X*3<(amount of incident light)≤X1

$$\text{Pixel signal HDR}=(\text{high output pixel signal})\times\beta+(\text{intermediate output pixel signal})\times\gamma\times2+(\text{low output pixel signal})\times(1-\beta-\gamma)\times4 \quad (3)$$

When X1<(amount of incident light)≤X2

$$\text{Pixel signal HDR}=(\text{intermediate output pixel signal})\times(1-\delta)\times2+(\text{low output pixel signal})\times\delta\times4 \quad (4)$$

When X2<(amount of incident light)≤X3

$$\text{Pixel signal HDR}=(\text{Low output pixel signal})\times4 \quad (5)$$

$\alpha$, $\beta$, $\gamma$, $\delta$, and $\beta+\gamma$ in the above equations are combination coefficients, and it is assumed that their values are positive real numbers of 1 or less. The signal after HDR processing is generated from a low output pixel signal, an intermediate output pixel signal, and a high output pixel signal in accordance with the amount of incident light. The video signal processing unit 104 calculates the pixel signal after the dynamic range expansion process using Equations (1) to (5) in accordance with the amount of signals (the amount of incident light) of each pixel unit 201 of the pixel array unit 202. By acquiring and three different types of output levels of combining signals in single shooting, the amount of signals is expanded from Y1 to Y3, and a image with a wide dynamic range in which X*1 to X3 can be handled as the amount of incident light can be generated.

Figure 9:
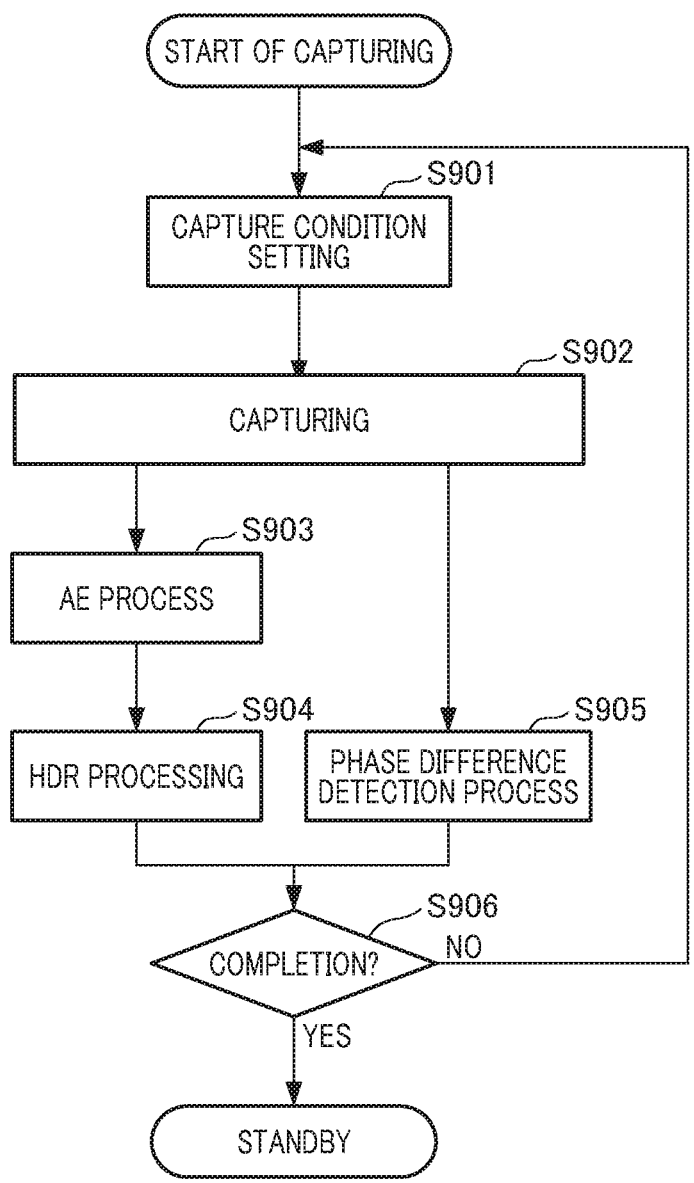
FIG. 9 is a flowchart illustrating a process according to the first embodiment of the present invention.

Processing in the present embodiment will be described by producing the flowchart of FIG. 9. When shooting is started, the control calculation unit 103 performs a capture condition setting process in step S901. Various parameters are set on the basis of an exposure condition, a focus position, and the like acquired one frame before and saved in the data recording unit 107 in advance. For example, a setting process in which the intermediate output pixel has an appropriate exposure condition is performed. The output of the low output pixel is set to be half the output of the intermediate output pixel, and the output of the high output pixel is set to be twice the output of the intermediate output pixel. Thus, a timing of the control signal to be sent to the transfer control line connected to the transfer transistors in the low output pixel and the high output pixel is set. The exposure ratio is determined according to the output condition setting of the pixel signal.

Next, in step S902, the imaging element 102 is driven under the control of the control calculation unit 103 in accordance with the capture conditions set in step S901, a capturing operation is performed, and the pixel signal is acquired. At this time, in order to set a capture condition of a subsequent frame, the control calculation unit 103 performs an AE process on the basis of the pixel signal obtained from the intermediate output pixel, and data on the capture condition such as an obtained exposure time, aperture value, gain setting, etc. is saved in the data recording unit 107. Also, hereinafter, the exposure time, the aperture value, and the gain setting are collectively referred to as an exposure condition.

The pixel signal acquired by the capturing in S902 is sent to the video signal processing unit 104 and the phase difference signal processing unit 106. Processing of S903 and S904 and Processing of S905 are performed in parallel. In step S903, the video signal processing unit 104 performs the AE process on the basis of the pixel signal acquired from the imaging element 102 to calculate an AE value. In step S904, the video signal processing unit 104 performs the HDR processing described in the present embodiment. In the HDR processing, image processing is performed using three different types of output levels of image signals based on the high output pixel, the intermediate output pixel, and the low output pixel.

On the other hand, in step S905, the phase difference signal processing unit 106 performs a phase difference detection process. The phase difference detection is performed using pixel signals of adjacent pixels which receive light passing through different pupil part regions and in which the same output level is set among the pixel signals obtained in step S902. In other words, the phase difference signal processing unit 106 performs a correlation calculation while relatively shifting two images using the image signal A and the image signal B, detects an amount of image shift from the correlation calculation result, and performs a well-known phase difference detection of converting the detected amount of image shift into an amount of defocus. In the example illustrated in FIG. 5, pixels for phase difference detection correspond to the pixel 1R, the pixel 2R, the pixel 3L, and the pixel 4L, all of which are intermediate output pixels. Obtained phase difference information (the amount of defocus and focus position information) is stored in the data recording unit 107. However, in the phase difference detection process, a high output pixel signal is not used when X1<(amount of incident light), and an intermediate output pixel signal is not used when X2<(amount of incident light). This is because the amount of signals exceeds a saturation level.

After the processing of S904 and S905 is completed, the process is shifted to S906, and the control calculation unit 103 determines whether or not to end the capturing. When it is determined that the capturing is to be ended, the control calculation unit 103 transitions to a standby state. On the other hand, if it is determined that the capturing is to be continued, the control calculation unit 103 returns to S901. The control calculation unit 103 reads the exposure condition obtained in step S903, the focus position obtained in step S905, and the like from the data recording unit 107, sets various parameters on the basis of information thereof, and iterates the capturing operation.

In the present embodiment, it is possible to perform HDR processing and the phase difference detection process on image signals acquired in single capturing. Further, in comparison to the case of processing pixel signals output from pixels with two different types of exposure conditions as is generally performed in HDR processing, processing of pixel signals output from pixels with three different types of exposure conditions is performed. In other words, gradation of the image can be enhanced and a wider dynamic range can be realized in comparison to the case of HDR processing with two types of exposure conditions.

Modified Embodiment

When phase difference detection is performed in the present embodiment, the method using the image signals A and B acquired from adjacent pixels which receive light passing through different pupil part regions and performing capturing under the same exposure condition is shown. However, when illuminance of the object is low or in a scene in which it is difficult to detect an image plane phase difference, it is possible to perform detection with higher accuracy by detecting the image plane phase difference using more pixel signals.

Therefore, in the modified example, the process of correcting output levels of pixel signals acquired from pixels with different exposure settings is performed. In other words, the image plane phase difference detection is performed using signals obtained by correcting signals of the plurality of pixels having different condition settings in addition to signals of the plurality of pixels having the same condition setting.

The ratio of output levels of the low output pixel, an intermediate output pixel, and the high output pixel will be described as being 1:2:4. In this case, the phase difference signal processing unit 106 obtains the high output pixel signal HS and the low output pixel signal LS after output level correction for each of the high output pixel and the low output pixel according to the following Equation (6).

High output pixel signal HS=(high output pixel signal)/(2+$Y$)

Low output pixel signal LS=(low output pixel signal)×(2−$Y$)   (6)

$Y$ in Equation (6) is the adjustment coefficient used for output level correction, and its value is a predetermined positive real number.

According to the output level correction process, the high output pixel signal and the low output pixel signal are corrected to pixel signals having the same level as a pixel signal of the intermediate output pixel indicated by alternating long and short dashed lines in FIG. 8. Also, the noise level Y1 and the level Y2 of the saturation amount of signals are estimated from the amount of pixel signals of the low output pixel.

In this modified embodiment, the output difference between the image signal A and the image signal B is corrected, and levels of the pixel signals becomes the same level. Consequently, the phase difference signal processing unit 106 can perform a phase difference detection process using more image signals. However, in the phase difference detection process, the high output pixel signal is not used when X1<(amount of incident light), and the intermediate output pixel signal is not used when X2<(amount of incident light).

Second Embodiment

Hereinafter, the second embodiment of the present invention will be described with reference to FIGS. 1, 2, 4B, 10A, and 10B to 13. In the present embodiment, an example in which a pixel unit includes four photoelectric conversion units that receive light passing through four different pupil part regions will be described. Because the system configuration and the like of the imaging apparatus in the present embodiment are similar to those of the first embodiment, detailed descriptions thereof will be omitted by using the already used reference signs, and differences will be mainly described.

Figure 10A:
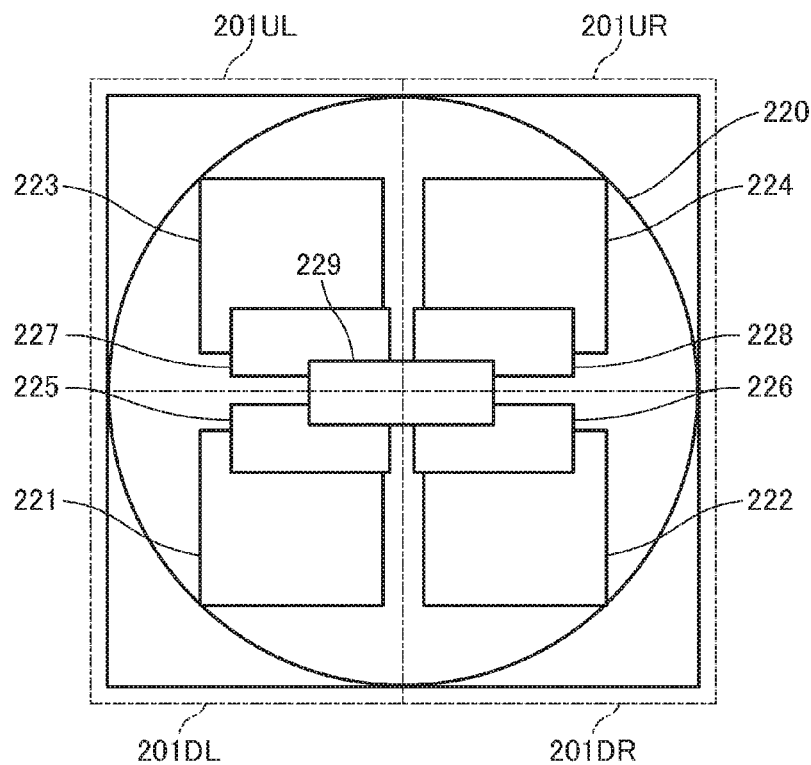
FIGS. 10A and 10B are diagrams illustrating the pixel configuration and the pixel array of the imaging element according to a second embodiment of the present invention.

A pixel configuration and pixel array of a pixel unit 201 of an imaging element 102 in the present embodiment will be described with reference to FIGS. 10A and 10B. FIG. 10A illustrates an outline of a basic element configuration of the pixel unit 201. The pixel unit 201 includes four photoelectric conversion units 201DL, 201DR, 201UL, and 201UR. The pixel unit 201 includes PDs 221, 222, 223, and 224, transfer transistors 225, 226, 227, and 228, and an FD unit 229. Light passing through different pupil part regions of the optical imaging system is received by the four photoelectric conversion units. The photoelectric conversion units 201DL, 201DR, 201UL and 201UR are configured under one microlens 220, and respectively have one PD 221, one PD 222, one PD 223, and one PD 224.

The PD 221, the PD 222, the PD 223, and the PD 224 respectively have transfer transistors 225, 226, 227, and 228 for reading pixel signals, and share the FD unit 229 for temporarily accumulating pixel signals. Each of pixel signal output from the PDs passes through a vertical signal line 207 and a column signal processing circuit 204, and is read through a horizontal signal line 209 by a horizontal driving circuit 205 at any time in units of rows.

Figure 10B:
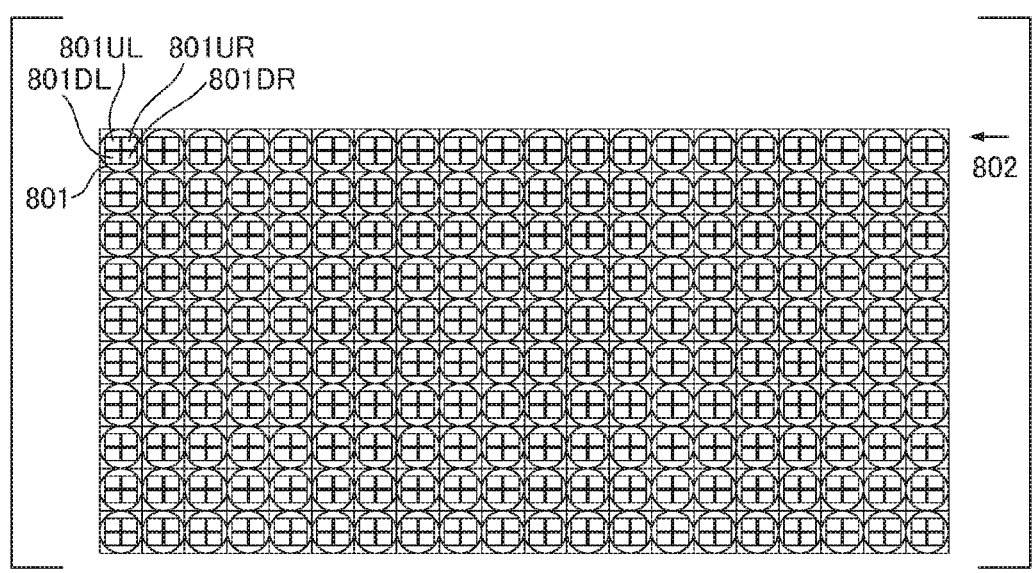

FIG. 10B is a plan view schematically illustrating a pixel array in the imaging element 102. In order to provide a two-dimensional image, a plurality of pixel units 801 are arranged in a two-dimensional array. The pixel unit 801 is one pixel unit included in a row 802 and has PDs 801DL, 801DR, 801UL, and 801UR. The PDs 801DL, 801DR, 801UL, and 801UR respectively correspond to the PDs 221, 222, 223, 224 of FIG. 10A. A state in which light is received in the imaging element 102 will be described with reference to FIG. 4B.

Figure 4B:
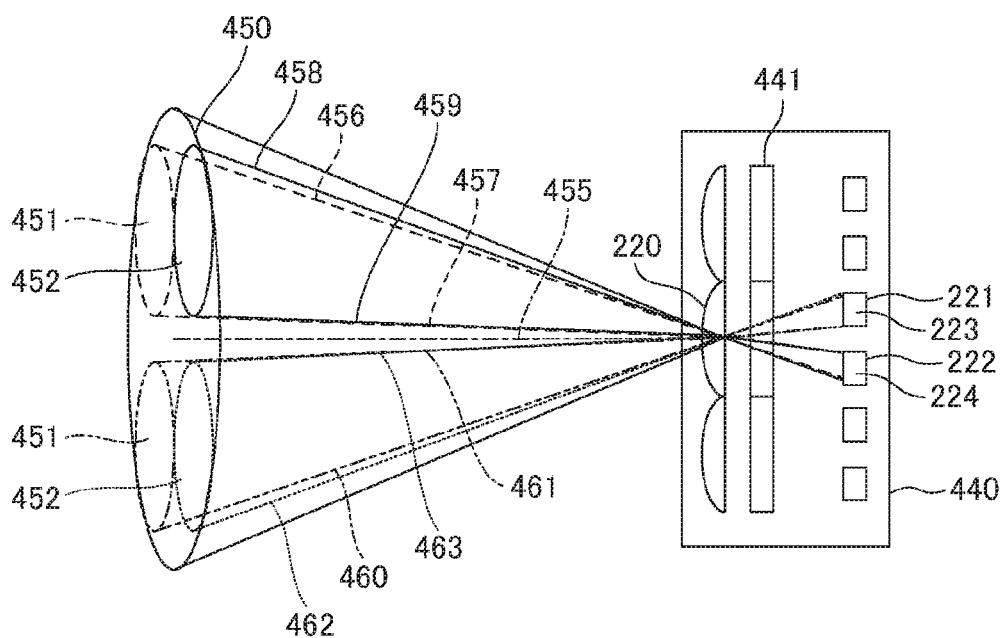

FIG. 4B is a conceptual diagram illustrating a state in which a light beam emitted from an exit pupil of a capturing lens is incident on the imaging element 102. The microlens 220, a color filter 441, and PDs 221, 222, 223, and 224 are shown in a cross section 440 of the pixel unit 201. In an exit pupil 450, pupil part regions 451, 452, 453, and 454, which are part regions of the exit pupil of the capturing lens, are shown. An optical axis 455, which is a center of a light beam emitted from the exit pupil 420 for a pixel having the central microlens 220, is shown. Light rays 456 and 457 are outermost light rays of light passing through the pupil part region 451, and light rays 458 and 459 are outermost light rays of light passing through the pupil part region 452. Light rays 460 and 461 are outermost light rays of light passing through the pupil part region 453, and light rays 462 and 463 are outermost rays of light passing through the pupil part region 454. It is assumed that the PD 221 and the PD 222 in the cross section 440 are respectively arranged on back sides of the PD 223 and the PD 224. Light emitted from the exit pupil 450 is incident on the imaging element 102 around the optical axis 455. Among light beams emitted from the exit pupil 450, a lower right light beam with respect to a boundary of the optical axis 455 is incident on the PD 221, a lower left light beam is incident on the PD 223, an upper right light beam is incident on the PD 222, and an upper left light beam is incident on the PD 224. In other words, the PDs 221, 223, 222, and 224 receive light beams respectively passing through the different pupil part regions 454, 453, 452, and 451 of the exit pupil 450 of the capturing lens.

The pixel unit 801 included in the row 802 will be described with respect to FIG. 10B. The PD 801UL corresponds to the PD 223 of FIG. 10A. An image obtained from the PD 801UL serves as an image A, and a pixel signal thereof is referred to as an image signal A. The PD 801UR corresponds to the PD 224 of FIG. 10A. An image obtained from the PD 801UR serves as an image B, and a pixel signal thereof is referred to as an image signal B. The PD 801DL corresponds to the PD 221 of FIG. 10A. An image obtained from the PD 801DL serves as an image C, and a pixel signal thereof is referred to as an image signal C. The PD 801DR corresponds to the PD 222 of FIG. 10A. An image obtained from the PD 801DR serves as an image D, and a pixel signal thereof is referred to as an image signal D.

In this manner, the exit pupil 450 is equally divided into four pupil part regions 451, 452, 453, and 454 around the optical axis 455, and each PD receives light so that a change in a focus state occurs in each of the PDs 221, 222, 223, and PD 224. In the image signal A, the image signal B, the image signal C, and the image signal D corresponding to the pupil part regions according to the change in the focus state, a change in an address of the pixel unit 201, in which the pixel signal derived from the same object image appears, is shown and detected as an address interval. By detecting the address interval (phase difference detection), an amount of defocus can be calculated. The four PDs are equally divided and arranged with respect to the optical axis 455. Because the four PDs are not eccentric with respect to the exit pupil 450, there is an advantage in that it is easy to deal with signal loss (shading) of images from the image A to the image D even if some light rays are obstructed by constituent parts or the like in the optical lens barrel 101.

Figure 11A:
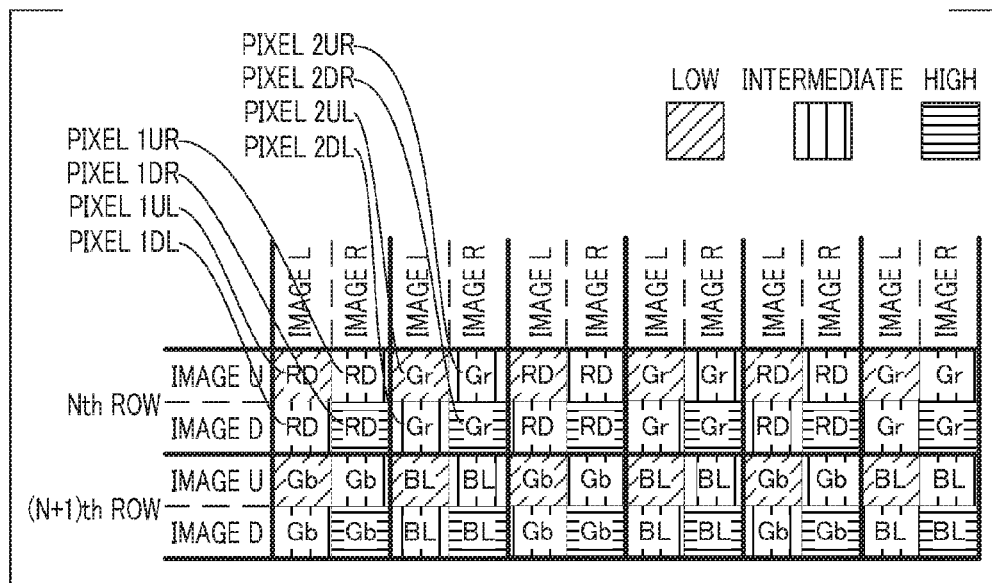
FIGS. 11A and 11B are schematic diagrams illustrating pixel signals from the imaging element according to the second embodiment of the present invention.

FIG. 11A illustrates an example in which four identical color pixels are formed in one pixel unit, and is a schematic diagram illustrating output levels in each pixel unit arranged in the pixel array illustrated in FIG. 10B. For example, for HDR processing, capturing is performed after a setting of exposure conditions is changed so that output level differences occur between the image signal A and the image signal B and between the image signal C and the image signal D. Also, in order to perform the phase difference detection, the same exposure condition is set for the image signal B and the image signal C and capturing is performed.

Figure 11B:
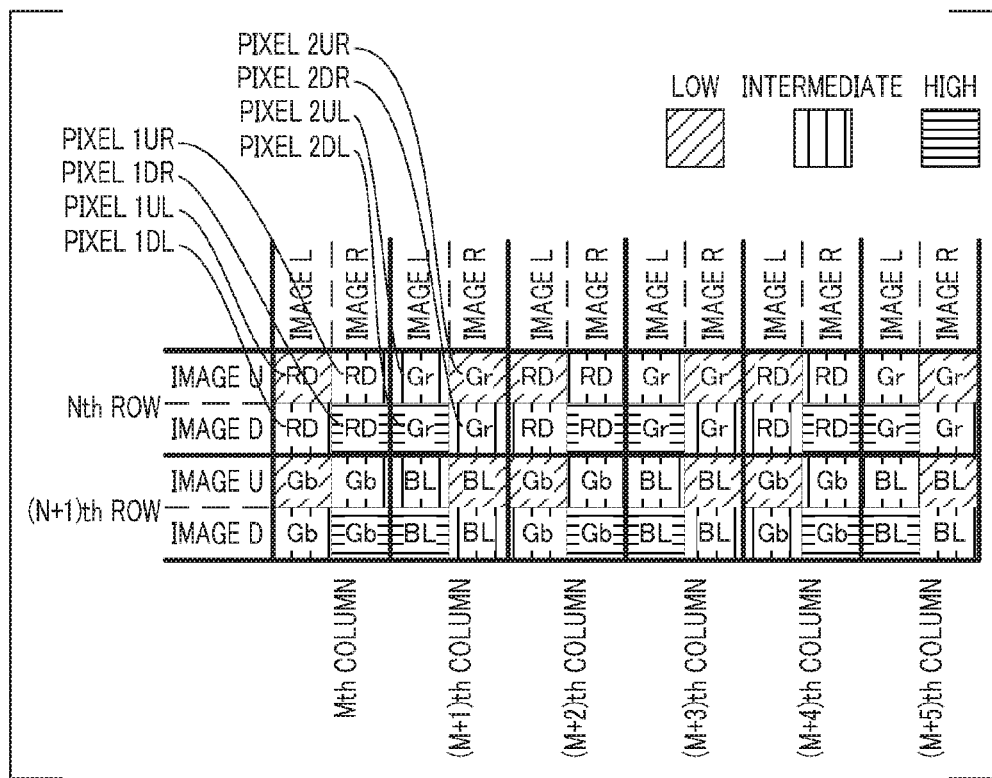

In each of the pixel units illustrated in FIGS. 11A and 11B, the following four types of pixel are defined according to a column distinguished by an image L and an image R and a row distinguished by an image U and an image D.

A pixel defined by a row indicated by the image U and a column indicated by the image L This pixel indicates a region corresponding to the photoelectric conversion unit 201UL and is a region where the PD 223 exists. This pixel is referred to as an image pixel A. The image pixel A outputs the image signal A as a pixel signal.

A pixel defined by a row indicated by the image U and a column indicated by the image R This pixel indicates a region corresponding to the photoelectric conversion unit 201UR and is a region where the PD 224 exists. This pixel is referred to as an image pixel B. The image pixel B outputs the image signal B as a pixel signal.

A pixel defined by a row indicated by the image D and a column indicated by the image L This pixel indicates a region corresponding to the photoelectric conversion unit 201DL and is a region where the PD 221 exists. This pixel is referred to as an image pixel C. The image pixel C outputs the image signal C as a pixel signal.

A pixel defined by a row indicated by the image D and a column indicated by the image R This pixel indicates a region corresponding to the photoelectric conversion unit 201DR and is a region where the PD 222 exists. This pixel is referred to as an image pixel D. The image pixel D outputs the image signal D as a pixel signal.

In FIG. 11A, three different types of hatched lines are used to express output levels of pixels as follows.

A pixel indicated by coarse slanted lines is a pixel of a low output level and is referred to as a low output pixel.

A pixel indicated by vertical lines is a pixel of an intermediate output level and is referred to as an intermediate output pixel.

A pixel indicated by horizontal lines is a pixel of a high output level and is referred to as a high output pixel.

As can be seen from FIG. 11A, the image pixel A is the low output pixel, the image pixel B and the image pixel C are intermediate output pixels in which the same exposure condition is set, and the image pixel D is the high output pixel. In each pixel unit of the Nth row, the RD (red) filter and the Gr (green) filter are alternately arranged. Also, in each pixel unit of the (N+1)th row, the Gb (green) filter and the BL (blue) filter are alternately arranged. Although only the Nth to (N+1)th rows are extracted and shown, it is assumed that the plurality of pixel units are repeatedly arranged two-dimensionally in a cycle of two rows.

In the present embodiment, in order to generate output level differences between the image pixel A, the image pixel B, the image pixel C, and the image pixel D, an exposure time of each pixel or a degree of amplification of an amplification process in the column signal processing circuit 204 is set. For example, a different exposure time is set for each pixel or a degree of amplification of an amplifier in the column signal processing circuit 204 is set to a different value for each output. Alternatively, a different signal output condition may be set by combining both the exposure time and the degree of amplification. Specifically, for example, if the exposure times of the image pixel A and the image pixel B are set as a reference (×1), the exposure times of the image pixel C and the image pixel D are set to be twice the reference. Further, if the degree of amplification of an amplification process in the column signal processing circuit 204 of a stage subsequent to the image pixel A and the image pixel C is set as the reference (×1), the degree of amplification of an amplification process in the column signal processing circuit 204 of the stage subsequent to the image pixel B and the image pixel D is set to be twice the reference. Thereby, an output level ratio of the image pixel A, the image pixel B, the image pixel C, and the image pixel D can be set to be 1:2:2:4. In other words, the output level ratio of the low output pixel, the intermediate output pixel, and the high output pixel is 1:2:4 and pixel signals with three types of output levels can be obtained from one pixel unit.

Next, a modified example of an image signal acquired from the imaging element will be described with reference to FIG. 11B. In FIG. 11B, an output level ratio of the image pixel A, the image pixel B, the image pixel C, and the image pixel D are set with exposure conditions different from those in FIG. 11A.

In an even column (an Mth column, an (M+2)th column, an (M+4)th column . . . ), the output level ratio of the image pixel A, the image pixel B, the image pixel C, and the image pixel D is 1:2:2:4. On the other hand, in an odd column (an (M+1)th column, an (M+3)th column, an (M+5)th column . . . ), the output level ratio of the image pixel A, the image pixel B, the image pixel C, and the image pixel D is 2:1:4:2. In other words, the setting of the output level is the same between pixels of different color filters adjacent to each other in the same row. In order to realize such an output level, for example, the setting is made as follows.

If the exposure times of the image pixel A and the image pixel B are set as the reference (×1) in both the even column and the odd column exposure times of the image pixel C and the image pixel D are set to be twice the reference. If a degree of amplification of an amplification process in the column signal processing circuit 204 of a stage subsequent to the image pixel A and the image pixel C in the even column is set as the reference (×1), a degree of amplification of an amplification process in the column signal processing circuit 204 of a stage subsequent to the image pixel B and the image pixel D is set to be twice the reference. If a degree of amplification of an amplification process in the column signal processing circuit 204 of a stage subsequent to the image pixel A and the image pixel C in the odd column is doubled, a degree of amplification of an amplification process in the column signal processing circuit 204 of a stage subsequent to the image pixel B and the image pixel D is set to be ×1. Thereby, because the degree of amplification of the amplification process in the column signal processing circuit of the stage subsequent to the image pixel A and the image pixel C in the even column is the same as that of the column signal processing circuit of the stage subsequent to the image pixel B and the image pixel D in the odd column, it is possible to share the circuit unit. Likewise, because the degree of amplification of the amplification process of the column signal processing circuit of the stage subsequent to the image pixel B and the image pixel D in the even column is the same as that of the column signal processing circuit in the stage subsequent to the image pixel A and the image pixel C in the odd column, it is possible to share the circuit unit. Consequently, by adopting the configuration of FIG. 11B, it is possible to reduce the number of column signal processing circuits, and the reduced number of column signal processing circuits contributes to a reduction in a circuit area and a reduction in power consumption. Although the present embodiment has been described as reading all rows, the same is true for a thinning read driving method most suitable for capturing a moving image or the like.

Pixel signals of three types of output levels are output from the imaging element 102 and then sent to the video signal processing unit 104 and the phase difference signal processing unit 106. HDR processing using the image signal A, the image signal B, the image signal C, and the image signal D is performed.

In the phase difference detection process, in the case of FIG. 11A, the image signal B and the image signal C having the same exposure condition and having the phase difference are used. In FIGS. 11A and 11B, pixels of an image column L in the first pixel unit are denoted by 1UL and 1DL, and pixels of an image column R in the first pixel unit are denoted by 1UR and 1DR. Pixels in the image column L in the second pixel unit adjacent to the first pixel unit are denoted by 2UL and 2DL, and pixels in the image column R in the second pixel unit are denoted by 2UR and 2DR. In this case, phase difference detection is performed using the pixel 1UR and the pixel 1DL or the pixel 2UR and the pixel 2DL. Also, in the case of FIG. 11B, the image signal B and the image signal C or the image signal A and the image signal D having the same exposure condition and having a phase difference are used. In other words, the phase difference detection is performed using the pixel 1UR and the pixel 1DL or the pixel 2DR and the pixel 2UL.

Figure 12:
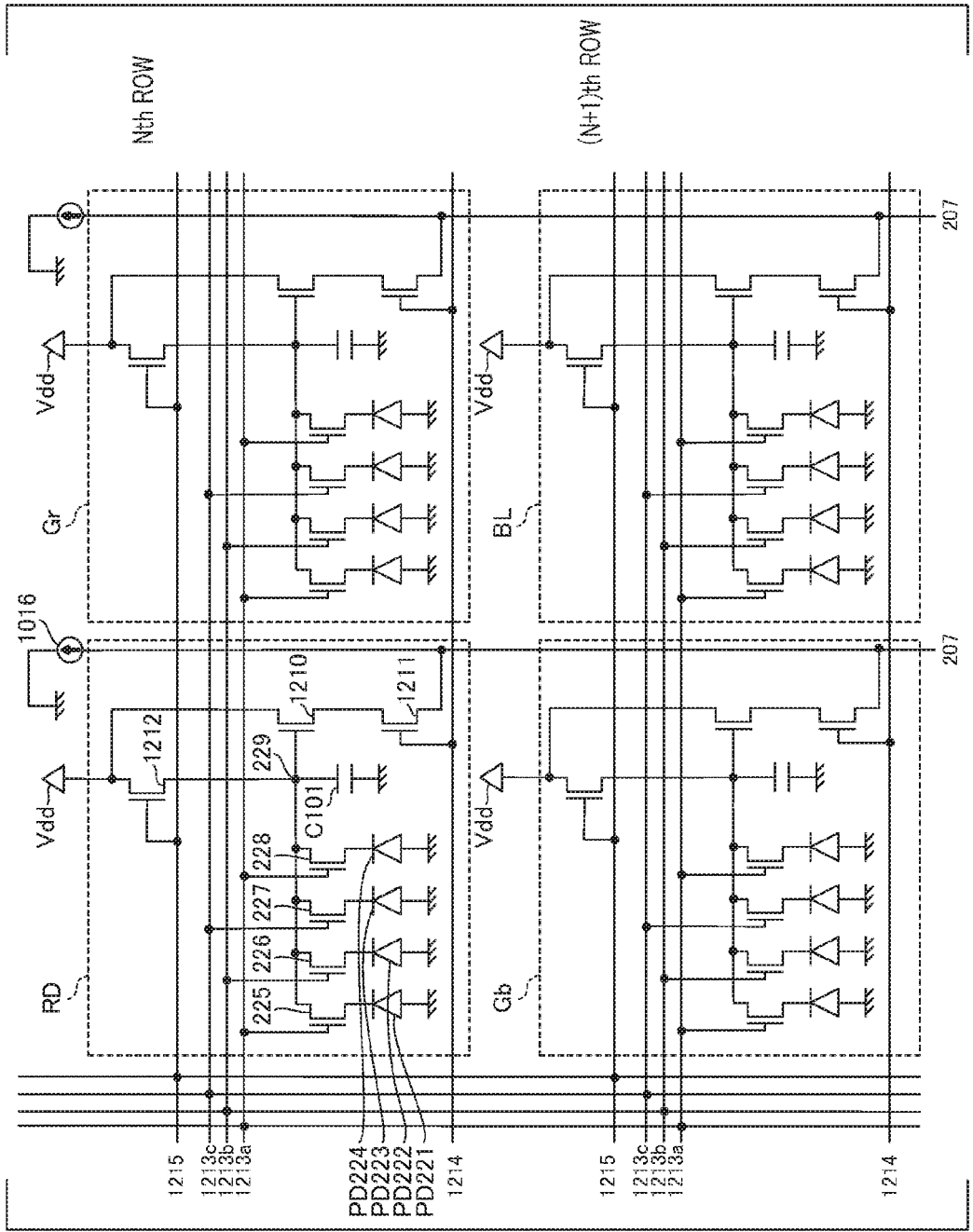
FIG. 12 is a circuit configuration diagram of the imaging element according to the second embodiment of the present invention.

Next, the circuit configuration and basic operation of the imaging element 102 in the present embodiment will be described with reference to FIG. 12. FIG. 12 is an equivalent circuit diagram illustrating a circuit configuration of each pixel unit, and illustrates pixel units (four pixel parts of RD, Gr, Gb, and BL) of the Nth row and the (N+1)th row of FIG. 11A among the two-dimensionally arranged pixel units.

Each pixel unit includes the PDs 221 to 224 and the FD unit 229. Further, the transfer transistors 225 to 228, an amplification transistor 1210, a selection transistor 1211, and a reset transistor 1212 are provided.

The PDs 221 to 224 are elements for accumulating a charge generated by photoelectric conversion and have sides P which are grounded and sides N respectively connected to sources of the transfer transistors 225 to 228. A transfer control line 1213a is connected to a gate of the transfer transistor 225, and a transfer control line 1213b is connected to a gate of the transfer transistor 226. A transfer control line 1213c is connected to a gate of the transfer transistor 227, and a transfer control line 1213a is connected to a gate of the transfer transistor 228.

When the transfer transistor 225, 226, 227, or 228 is turned on, a charge of the corresponding PD 221, PD 222, PD 223, or PD 224 is transferred to the FD unit 229, and the charge is accumulated in a parasitic capacitor C101 of the FD unit 229. Thereby, the same exposure time is set in the PD 221 and the PD 224 and different exposure times are set in the PD 222 and PD 223. In other words, the transfer control lines are separately configured for the four photoelectric conversion units 201DR, 201UL, 201DL and 201UR. Therefore, it is possible to separately set exposure times for the four photoelectric conversion units 201DR, 201UL, 201DL and 201UR.

Also, a row selection control line 1214 and a reset control line 1215 constituting the pixel drive wiring 208 are respectively connected to gates of the selection transistor 1211 and the reset transistor 1212. These control lines extend in the horizontal direction and simultaneously drive the pixel units included in the same row. Thereby, it is possible to control an operation of a sequential line operation type rolling shutter or a simultaneous all row operation type global shutter. The vertical signal line 207 is connected to a source of the selection transistor 1211, and one end of the vertical signal line 207 is grounded via a constant current source 1016.

A power supply voltage Vdd is applied to a drain of the amplification transistor 1210, and a gate thereof is connected to the FD unit 229. The amplification transistor 1210 amplifies a voltage of the FD unit 229 and outputs the amplified voltage. The selection transistor 1211 has a drain connected to a source of the amplification transistor 1210 and a source connected to the vertical signal line 207. When the selection transistor 1211 is turned on, the amplification transistor 1210 and the constant current source 1016 constitute a source follower circuit. A voltage corresponding to the voltage of the FD unit 229 is output to the vertical signal line 207. Because the power supply voltage Vdd is applied to the drain of the reset transistor 1212 and the source thereof is connected to the FD portion 1015, the voltage of the FD portion 229 is reset to the power supply voltage Vdd if the reset transistor 1212 is turned on.

Figure 13:
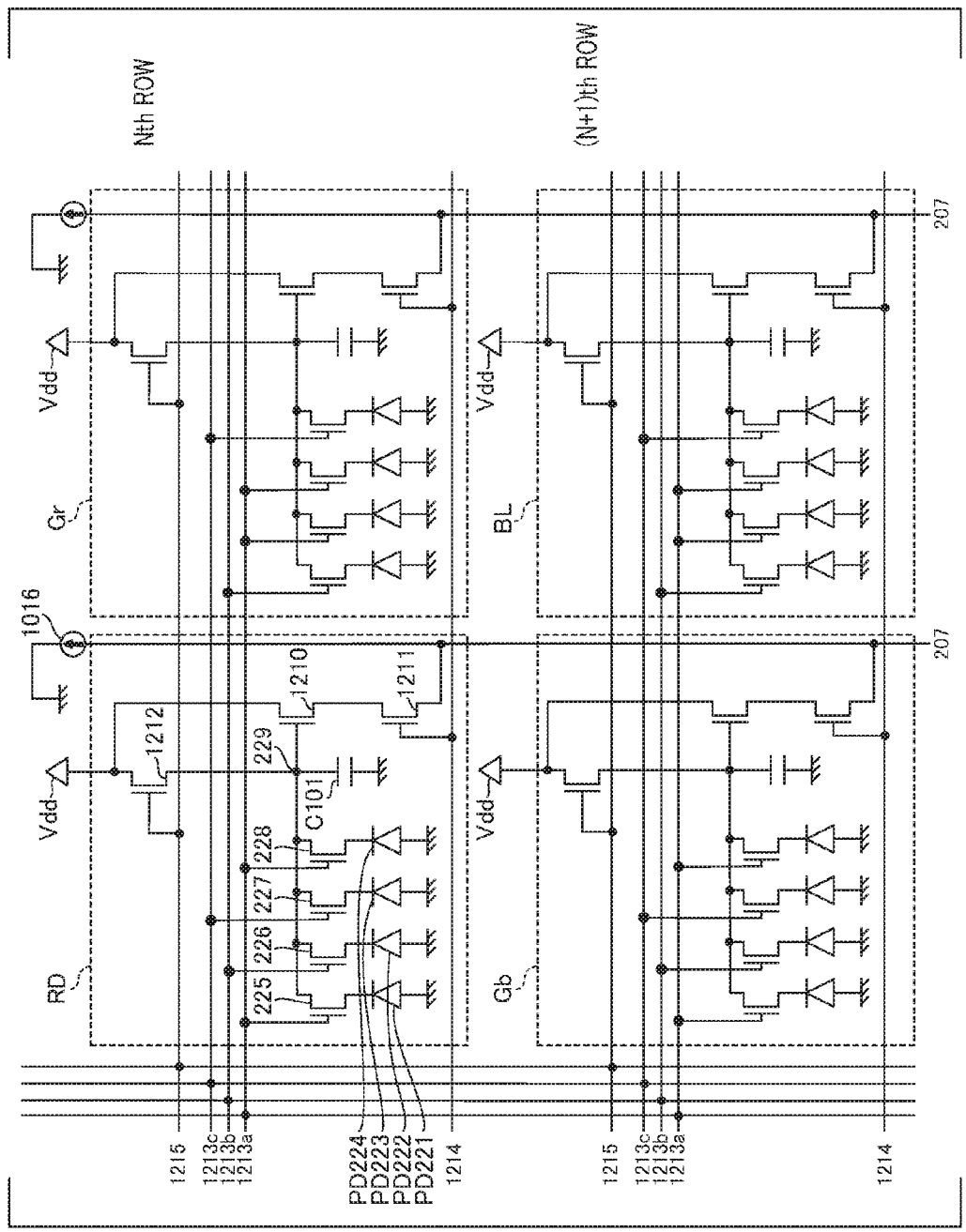
FIG. 13 is a circuit configuration diagram of an imaging element according to a modified example of the second embodiment of the present invention.

FIG. 13 is a circuit diagram of the pixel unit corresponding to FIG. 11B. A basic configuration thereof is the same as in FIG. 12. However, a connection relationship between the transfer transistor and the transfer control line is different from that of FIG. 12 in a column including the pixel unit of the Gr filter and the BL filter. In these columns, the connection relationship between the transfer transistor and the transfer control line is as follows.

The transfer control line 1213b is connected to a gate of the transfer transistor 225.

The transfer control line 1213a is connected to gates of the transfer transistors 226 and 227.

The transfer control line 1213c is connected to a gate of the transfer transistor 228.

Thereby, the same exposure time can be set for the PD 222 and the PD 223. Different exposure times can be set for the PD 221 and PD 224.

Each pixel unit of the present embodiment includes four photoelectric conversion units that receive light passing through four different pupil part regions. According to the present embodiment, HDR processing and a phase difference detection process can be performed using image signals acquired in single capturing. Further, when compared with the case of processing pixel signals output from pixels with two different types of exposure conditions as is generally performed in HDR processing, HDR processing of pixel signals output from pixels with three different types of exposure conditions is performed. Consequently, a gradation of a image can be enhanced and a wider dynamic range can be realized in comparison to the HDR processing with the two different exposure conditions. Further, it is possible to acquire signals from a plurality of photoelectric conversion units of each pixel unit of the same row, and to perform signal processing of highly accurate focus detection.

The configuration example in which the video signal processing unit 104 and the phase difference signal processing unit 106 are provided in the imaging element 102 has been described in the first and second embodiments, but at least some of the functions of these signal processing units may be configured to be provided in the imaging element. In this case, for example, the pixel array section (an imaging unit) in which the large number of pixel units are arrayed in the matrix and the signal processing unit for processing signals of each pixel unit are mounted on an integrated circuit chip in the imaging element. For example, in the case of a stacked imaging element, the imaging element has the configuration in which the second integrated circuit chip constituting the imaging unit is stacked on the first integrated circuit chip constituting the signal processing unit. At this time, it is only necessary to provide the correlation calculation unit that performs a correlation calculation on two images for focus detection and a calculation unit that calculates the amount of image shift from the correlation calculation result as the signal processing unit configured on the first integrated circuit chip. Thereby, because it is only necessary to output the amount of image shift (or an amount of defocus) or a distribution thereof as the output from the imaging element 102, it is possible to reduce a manufacturing cost of a sensor and secure a bandwidth of an image processing unit of a subsequent stage. Also, at this time, it is only necessary to provide a correction processing unit for correcting pixel defects or signal variations due to the imaging element 102 and the like, and a combination processing unit for performing HDR combination for HDR processing. Thereby, because the image signal of one frame after combination is output as the output from the imaging element 102, important processing for determining image quality can be entrusted to the image processing unit in a subsequent stage in which analysis or processing is enabled with higher accuracy in addition to a similar effect as described above. It goes without saying that the present invention is not limited to the above case and some or all of other processes for focus detection and HDR processing may be provided in the signal processing unit in the imaging element 102. As a specific configuration example of the signal processing unit, one signal processing unit for performing first signal processing, in which a bit range expansion process is performed, and second signal processing, in which phase difference detection is performed, in parallel may be provided in the HDR processing.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110502, filed Jun. 1, 2016 which is hereby incorporated by reference wherein in its entirety.

What is claimed is:

1. An imaging element for acquiring signals from a plurality of pixel units to perform a plurality of types of signal processing on the signals, wherein one pixel unit or two pixel units include first to fourth photoelectric conversion units, the imaging element comprising:
    at least one processor and at least one memory functioning as:
        a setting unit configured to set signal output conditions for the first, second, third and fourth photoelectric conversion units; and
        a signal processing unit configured to perform first signal processing using signals of the first, second, third and fourth photoelectric conversion units set with a plurality of output conditions by the setting unit and second signal processing for processing the signals of the first, second, third and fourth photoelectric conversion units set with any one of the plurality of output conditions by the setting unit.

2. The imaging element according to claim 1, wherein the signal processing unit combines output signals of the first to fourth photoelectric conversion units to perform a dynamic range expansion process of an image signal in the first signal processing and performs focus detection using the output signals of the first to fourth photoelectric conversion units in the second signal processing.

3. The imaging element according to claim 1,
    wherein a first pixel unit of the plurality of pixel units has the first and second photoelectric conversion units, a second pixel unit has the third and fourth photoelectric conversion units,
    wherein the setting unit sets different output conditions for the first and second photoelectric conversion units,
    wherein the setting unit sets different output conditions for the third and fourth photoelectric conversion units, and wherein the setting unit sets output conditions for the first photoelectric conversion unit and the fourth photoelectric conversion unit or output conditions for the second photoelectric conversion unit and the third photoelectric conversion unit to be the same.

4. The imaging element according to claim 3,
wherein the setting unit sets a first output condition for the first photoelectric conversion unit,
wherein the setting unit sets a second output condition for the second photoelectric conversion unit and the third photoelectric conversion unit, and
wherein the setting unit sets a third output condition for the fourth photoelectric conversion unit.

5. The imaging element according to claim 1, wherein the setting unit sets one or more of an exposure time, a degree of amplification, and a sensitivity of a signal as the output conditions for the first to fourth photoelectric conversion units.

6. The imaging element according to claim 3,
wherein the first and second pixel units are pixel units of different rows or columns, and
wherein the setting unit sets a different output condition for each row or column.

7. The imaging element according to claim 4, wherein the signal processing unit performs a dynamic range expansion process using a signal of the first photoelectric conversion unit set with the first output condition by the setting unit, a signal of the second or third photoelectric conversion unit set with the second output condition, and a signal of the fourth photoelectric conversion unit set with the third output condition in the first signal processing.

8. The imaging element according to claim 4, wherein the signal processing unit performs focus detection using signals of the second and third photoelectric conversion units set with the second output condition by the setting unit in the second signal processing.

9. The imaging element according to claim 3, wherein the signal processing unit performs a process of acquiring signals of the first and second photoelectric conversion units or signals of the third and fourth photoelectric conversion units to correct a difference between signal levels, and performs focus detection using the corrected signal in the second signal processing.

10. The imaging element according to claim 1,
wherein a first pixel unit and a second pixel unit of the plurality of pixel units each include the first to fourth photoelectric conversion unit,
wherein the setting unit independently sets output conditions for the first to fourth photoelectric conversion units, and
wherein the signal processing unit performs the first signal processing using signals of the first to fourth photoelectric conversion unit set with different output conditions by the setting unit.

11. The imaging element according to claim 10, wherein the signal processing unit acquires signals combining the output conditions from the first to fourth photoelectric conversion units, and performs the second signal processing on the signals.

12. The imaging element according to claim 10,
wherein the first and second pixel units are adjacent pixel units of the same row, and
wherein the second and fourth photoelectric conversion units provided in the first pixel unit and the first and third photoelectric conversion units provided in the second pixel unit are set to have the same degree of signal amplification.

13. The imaging element according to claim 12,
wherein a third pixel unit is a pixel unit adjacent to the first pixel unit in the same row as the first and second pixel units, and
wherein the first and third photoelectric conversion units provided in the first pixel unit and second and fourth photoelectric conversion units provided in the third pixel unit are set to have the same degree of signal amplification.

14. The imaging element according to claim 1, wherein the first and second signal processing is performed in parallel.

15. The imaging element according to claim 1,
wherein the pixel unit includes a microlens and the photoelectric conversion unit corresponding to the microlens, and
wherein the photoelectric conversion unit receives light passing through different pupil part regions of an optical imaging system and outputs the signal.

16. An imaging apparatus for acquiring signals from an imaging element including a plurality of pixel units to perform a plurality of types of signal processing on the signals, wherein one pixel unit or two pixel units include first to fourth photoelectric conversion units, the imaging apparatus comprising:
at least one processor and at least one memory functioning as:
a setting unit configured to set signal output conditions for the first, second, third and fourth photoelectric conversion units; and
a signal processing unit configured to perform first signal processing using signals of the first, second, third and fourth photoelectric conversion units set with a plurality of output conditions by the setting unit and second signal processing for processing the signals of the first, second, third and fourth photoelectric conversion units set with any one of the plurality of output conditions by the setting unit.

17. An imaging signal processing method of acquiring signals from a plurality of pixel units to perform a plurality of types of signal processing on the signals wherein one pixel unit or two pixel units include first to fourth photoelectric conversion units, the imaging signal processing method comprising:
setting signal output conditions for the first, second, third and fourth photoelectric conversion units; and
performing first signal processing using signals of the first, second, third and fourth photoelectric conversion units set with a plurality of output conditions in the setting and second signal processing for processing the signals of the first, second, third and fourth photoelectric conversion units set with any one of the plurality of output conditions in the setting.

* * * * *